(12) United States Patent
Koyama et al.

(10) Patent No.: US 8,840,997 B2
(45) Date of Patent: Sep. 23, 2014

(54) COVER GLASS AND METHOD FOR PRODUCING SAME

(75) Inventors: Akihiro Koyama, Takarazuka (JP); Satoshi Ami, Yokkaichi (JP); Kazuaki Hashimoto, Akiruno (JP); Tetsuo Takano, Tachikawa (JP)

(73) Assignees: AvanStrate Inc., Mie (JP); Hoya Corporation, Tokyo (JP)

( * ) Notice: Subject to any disclaimer, the term of this patent is extended or adjusted under 35 U.S.C. 154(b) by 0 days.

(21) Appl. No.: 13/338,651

(22) Filed: Dec. 28, 2011

(65) Prior Publication Data

US 2012/0171497 A1    Jul. 5, 2012

(30) Foreign Application Priority Data

Dec. 29, 2010  (JP) ................................. 2010-294538
Mar. 28, 2011  (JP) ................................. 2011-071020

(51) Int. Cl.
*B32B 17/06*     (2006.01)
*C03C 21/00*    (2006.01)
*C03C 3/085*    (2006.01)

(52) U.S. Cl.
CPC .............. *C03C 3/085* (2013.01); *C03C 21/002* (2013.01)
USPC ........... 428/410; 428/426; 428/428; 428/688; 428/689; 428/699; 428/701; 428/702

(58) Field of Classification Search
CPC ............ C03C 3/00; C03C 3/04; C03C 3/076; C03C 3/083; C03C 3/085; C03C 15/00; C03C 21/00; C03C 21/001; C03C 21/002; C03C 2204/08; C03C 2203/00; B32B 17/00; B32B 17/06; B32B 33/00; B32B 2255/00; B32B 2255/20; B32B 2457/20; B32B 2457/208
USPC ......... 428/410, 426, 688, 428, 689, 699, 701, 428/702
See application file for complete search history.

(56) References Cited

U.S. PATENT DOCUMENTS

| | | | | |
|---|---|---|---|---|
| 4,055,703 A * | 10/1977 | Rinehart | ...................... | 428/410 |
| 4,726,981 A | 2/1988 | Pierson et al. | | |
| 5,057,134 A * | 10/1991 | Suzuki et al. | ................ | 65/30.13 |
| 5,780,371 A * | 7/1998 | Rifqi et al. | ...................... | 501/67 |
| 5,846,280 A * | 12/1998 | Speit | ............................ | 65/30.14 |
| 5,895,768 A * | 4/1999 | Speit | ........................... | 428/846.9 |
| 6,413,892 B1 | 7/2002 | Koyama et al. | | |
| 6,518,211 B1 * | 2/2003 | Bradshaw et al. | .............. | 501/69 |
| 6,576,353 B1 | 6/2003 | Mitani et al. | | |
| 7,666,511 B2 | 2/2010 | Ellison et al. | | |
| 7,687,420 B2 * | 3/2010 | Murata | .......................... | 501/68 |
| 7,727,917 B2 * | 6/2010 | Shelestak et al. | .............. | 501/69 |
| 7,871,703 B2 * | 1/2011 | Shelestak et al. | ............ | 428/410 |
| 8,168,295 B2 * | 5/2012 | Murata | ........................ | 428/410 |
| 2003/0031878 A1 | 2/2003 | Mitani et al. | | |
| 2003/0220183 A1 * | 11/2003 | Kurachi et al. | ................. | 501/70 |
| 2005/0003136 A1 * | 1/2005 | Kurachi et al. | ............. | 428/65.3 |
| 2005/0090377 A1 * | 4/2005 | Shelestak et al. | ............... | 501/69 |
| 2005/0244656 A1 | 11/2005 | Ikenishi et al. | | |
| 2006/0063009 A1 * | 3/2006 | Naitou et al. | ................. | 428/427 |
| 2008/0020919 A1 * | 1/2008 | Murata | ............................ | 501/66 |
| 2009/0142568 A1 | 6/2009 | Dejneka et al. | | |
| 2009/0197088 A1 * | 8/2009 | Murata | ........................ | 428/410 |
| 2009/0220761 A1 * | 9/2009 | Dejneka et al. | .............. | 428/220 |
| 2009/0263662 A1 * | 10/2009 | Shelestak et al. | ............. | 428/410 |
| 2009/0325776 A1 * | 12/2009 | Murata | ............................ | 501/66 |
| 2010/0035745 A1 * | 2/2010 | Murata | ............................ | 501/66 |
| 2010/0047521 A1 * | 2/2010 | Amin et al. | .................... | 428/141 |
| 2010/0087307 A1 * | 4/2010 | Murata et al. | ................... | 501/67 |
| 2010/0119846 A1 * | 5/2010 | Sawada | ......................... | 428/426 |
| 2010/0255350 A1 | 10/2010 | Endo et al. | | |
| 2011/0014475 A1 * | 1/2011 | Murata | ........................ | 428/410 |
| 2011/0079048 A1 * | 4/2011 | Shelestak et al. | ............ | 65/30.14 |
| 2011/0274916 A1 * | 11/2011 | Murata | ......................... | 428/332 |
| 2011/0277508 A1 | 11/2011 | Osawa et al. | | |
| 2011/0318571 A1 * | 12/2011 | Murata | ........................ | 428/332 |
| 2011/0318572 A1 * | 12/2011 | Murata | ........................ | 428/332 |
| 2012/0083401 A1 * | 4/2012 | Koyama et al. | ................. | 501/70 |
| 2012/0141760 A1 * | 6/2012 | Murata | ......................... | 428/220 |
| 2012/0141801 A1 * | 6/2012 | Murata | ......................... | 428/410 |
| 2012/0171497 A1 * | 7/2012 | Koyama et al. | .............. | 428/428 |
| 2012/0196110 A1 * | 8/2012 | Murata et al. | ................. | 428/220 |
| 2012/0251827 A1 * | 10/2012 | Murata | ......................... | 428/410 |
| 2013/0209751 A1 | 8/2013 | Zhang et al. | | |

FOREIGN PATENT DOCUMENTS

| | | |
|---|---|---|
| JP | 61286245 | 12/1986 |
| JP | 1111974 A | 1/1999 |
| JP | 2000268348 A | 9/2000 |
| JP | 2004-131314 A | 4/2004 |
| JP | 2010-180076 A | 8/2004 |
| JP | 2005314159 A | 11/2005 |
| JP | 2007-99557 A | 4/2007 |
| JP | 2007-128054 A | 5/2007 |
| JP | 2008-1590 A | 1/2008 |
| JP | 2008-115071 A | 5/2008 |
| JP | 2008-115072 A | 5/2008 |
| JP | 2008-195602 A | 8/2008 |
| JP | 2009-13052 A | 1/2009 |
| JP | 2009-057271 A | 3/2009 |
| JP | 2009-084076 A | 4/2009 |
| JP | 2010-030876 A | 2/2010 |
| JP | 2010-59038 A | 3/2010 |
| JP | 2010-168233 A | 8/2010 |
| JP | 2010-180076 A | 8/2010 |
| JP | 2010-527892 A | 8/2010 |
| JP | 2010168252 A | 8/2010 |
| JP | 2010254549 A | 11/2010 |
| JP | 2013528561 A | 7/2013 |
| WO | 2011096310 A1 | 8/2011 |
| WO | 2011125477 A1 | 10/2011 |

* cited by examiner

*Primary Examiner* — David Sample
*Assistant Examiner* — Lauren Colgan
(74) *Attorney, Agent, or Firm* — Sughrue Mion, PLLC

(57) ABSTRACT

A cover glass having a compressive-stress layer on the principal surfaces thereof, and having a glass composition containing 50% to 70% by mole of $SiO_2$, 3% to 20% by mole of $Al_2O_3$, 5% to 25% by mole of $Na_2O$, more than 0% by mole and less than or equal to 2.5% by mole of $Li_2O$, 0% to 5.5% by mole of $K_2O$, and 0% to less than 3% by mole of $B_2O_3$. Also disclosed is a method for producing a cover glass which includes: (i) preparing molten glass by melting a glass raw material; (ii) forming the prepared molten glass into a plate-like shape by a down-draw process and thereby obtaining a glass substrate; and (iii) forming a compressive-stress layer on the surface of the glass substrate.

24 Claims, No Drawings

COVER GLASS AND METHOD FOR PRODUCING SAME

CROSS-REFERENCE TO RELATED APPLICATIONS

This application claims priority to Japanese Applications No. 2010-294538 and No. 2011-71020 filed on Dec. 29, 2010 and on Mar. 28, 2011. The entire disclosures of Japanese Applications No. 2010-294538 and No. 2011-71020 are incorporated hereinto by reference.

BACKGROUND OF THE INVENTION

1. Field of the Invention

The present invention relates to cover glass and methods for producing same.

2. Background Information

Thin flat glass has been conventionally used, for example, as cover glass for protecting liquid-crystal display screens etc. of equipment such as mobile phones, PDAs, digital cameras, and FPDs and as cover glass for casings of mobile terminals. In recent years, mobile phones and PDAs have tended to become thinner and more sophisticated in functionality, and are required to have high mechanical strength. Thus, strengthened glass prepared by chemically strengthening a thin flat glass substrate is used as the cover glass.

Such strengthened glass is chemically strengthened by ion-exchange processing, for example. Ion-exchange processing generally involves the immersion of glass in a potassium salt solution (ion-exchange salt) at around 350° C. to 550° C. so as to exchange sodium ions and/or lithium ions on the glass surface with the potassium ions or the sodium ions contained in the ion-exchange salt and thereby form a compressive-stress layer on the glass surface.

Various types of glass with different compositions have been developed as glass raw materials for producing strengthened glass. Particularly, glass having high mechanical strength and heat resistance has been proposed for the production of the aforementioned chemically-strengthened cover glass (see Patent Literature 1: JP-A No. 2010-180076, for example).

This type of strengthened glass uses ion-exchange components in combination and, for example, defines the content of $Li_2O+Na_2O+K_2O$, but contains substantially no $Li_2O$. In this way, the strain point etc. can be increased while giving consideration to characteristics such as the devitrification of glass, the coefficient of thermal expansion, the thermal shock resistance, and the stress relaxation value.

The glass transition temperature (Tg) tends to increase with the increase in strain point, which will provide the glass with favorable characteristics in terms of improvement in heat resistance. This, however, will increase the optimal ion-exchange processing temperature at which a predetermined compressive-stress value suitable for the glass composition can be achieved reliably. For example, as described in Paragraph 84 etc. of Patent Literature 1, if ion-exchange processing is carried out at relatively low temperatures (440 to 450° C.), then it will require around 6 hours to form a compressive-stress layer having a preferable depth of 20 μm or greater. This is disadvantageous in that production efficiency is significantly reduced.

By including $Li_2O$, the glass transition point can be lowered effectively, and it is also anticipated that the ion-exchange time can be shortened. However, large amounts of $Li_2O$ may cause other problems; for example, the Li concentration in the molten salt (ion-exchange salt) at the time of ion-exchange processing may become too high, which may inhibit ion exchange and reduce compressive stress.

Meanwhile, including fairly large amounts of $Li_2O$ in the glass composition can efficiently lower the glass transition temperature (Tg) and improve the ion exchangeability. Accordingly, various kinds of glass having glass compositions containing $Li_2O$ have been proposed (see, for example, Patent Literature 2: JP-A No. 2004-131314 and Patent Literature 3: US2009-0142568A1).

As described above, a compressive-stress layer that provides strengthened glass with the necessary stress is generally formed by exchanging the sodium ions and/or lithium ions on the glass surface with potassium ions and/or sodium ions in the ion-exchange salt. Indices indicating the aforementioned stress, such as the compressive-stress value and the surface stress depth of layer, are generally found by observing the fringe pattern, which represent the glass surface's refractive index that has changed as a result of the ion-exchange processing (i.e., the birefringent characteristic), while retaining the form of the strengthened glass.

However, if the amount of $Li_2O$ is too large, then the fringe pattern caused by the refractive index cannot be observed, and thus the compressive-stress value and the surface stress depth of layer cannot be measured while retaining the form of the strengthened glass. Even if a faint fringe pattern could be observed, that would not allow the correct measurement of the compressive-stress value and the surface stress depth of layer. So, in order to measure the strength of the obtained strengthened glass, it becomes necessary to destruct the strengthened glass plate. Also, other problems emerge; for example, the steps required until the measurement can be conducted become complicated.

Accordingly, it is necessary to balance the relationship among the lowering of the ion-exchange processing temperature, the reduction of ion-exchange time, the ease of measuring the compressive-stress layer, and heat resistance, and find a trade-off.

SUMMARY OF THE INVENTION

The present invention has been made in view of the aforementioned problems, and an objective of the invention is to provide a cover glass whose compressive-stress layer can be measured easily and that can be produced efficiently by being improved in ion exchangeability, and a method for producing the cover glass.

Another objective of the invention is to provide a cover glass improved in ion exchangeability and having excellent mechanical strength, and a cover glass production method that can offer sufficient ion-exchange performance even in a short processing time and that can improve the mechanical strength of the cover glass.

(1) One aspect of the invention relates to a cover glass (A) including a compressive-stress layer on the principal surfaces thereof, the cover glass (A) having a glass composition containing 50% to 70% by mole of $SiO_2$, 3% to 20% by mole of $Al_2O_3$, 5% to 25% by mole of $Na_2O$, more than 0% by mole and less than or equal to 2.5% by mole of $Li_2O$, 0% to 5.5% by mole of $K_2O$, and 0% to less than 3% by mole of $B_2O_3$.

(2) The cover glass (A) according to Item (1) preferably contains 3% to 15% by mole of MgO.

(3) The cover glass (A) according to Item (1) or (2) preferably contains 15.5% to 30% by mole of $Na_2O+Li_2O+K_2O$.

(4) The cover glass (A) according to any one of Items (1) to (3) preferably contains more than 12% by mole of $Na_2O$.

(5) In the cover glass (A) according to any one of Items (1) to (4), $Li_2O/(Na_2O+Li_2O+K_2O)$ is preferably greater than 0 and less than or equal to 0.2 in mole fraction.

(6) Another aspect of the invention relates to a method for producing a cover glass (A), involving:

(i) preparing molten glass by melting a glass raw material;
(ii) forming the prepared molten glass into a plate-like shape by a down-draw process and thereby obtaining a glass substrate having a glass composition containing
50% to 70% by mole of $SiO_2$,
3% to 20% by mole of $Al_2O_3$,
5% to 25% by mole of $Na_2O$,
more than 0% by mole and less than or equal to 2.5% by mole of $Li_2O$,
0% to 5.5% by mole of $K_2O$, and
0% to less than 3% by mole of $B_2O_3$; and
(iii) forming a compressive-stress layer on the surfaces of the glass substrate.

(7) Another aspect of the invention relates to a strengthened glass (A) including a compressive-stress layer on the principal surfaces thereof, the strengthened glass having a glass composition containing
50% to 70% by mole of $SiO_2$,
3% to 20% by mole of $Al_2O_3$,
5% to 25% by mole of $Na_2O$,
more than 0% by mole and less than or equal to 2.5% by mole of $Li_2O$,
0% to 5.5% by mole of $K_2O$, and
0% to less than 3% by mole of $B_2O_3$.

(8) Another aspect of the invention relates to a cover glass (B) including a compressive-stress layer on the principal surfaces thereof, the cover glass (B) having a glass composition containing
45% to 70% by mass of $SiO_2$,
5% to 25% by mass of $Al_2O_3$,
9% to 25% by mass of $Na_2O$,
more than 0% by mass and less than or equal to 2.5% by mass of $Li_2O$,
0% to 3% by mass of $B_2O_3$, and
more than 0% by mass and less than or equal to 10% by mass of MgO.

(9) The cover glass (B) according to Item (8) preferably contains 0% to 15% by mass of $K_2O$,
wherein $MgO/(Li_2O+Na_2O+K_2O)$ is preferably 0.11 or greater.

(10) The cover glass (B) according to Item (8) or (9) preferably contains 0% to 5% by mass of $ZrO_2$.

(11) The cover glass (B) according to any one of Items (8) to (10) preferably contains 0% to 15% by mass of $K_2O$,
wherein $Li_2O+Na_2O+K_2O$ is preferably 30% by mass or less.

(12) In the cover glass (B) according to any one of Items (8) to (11), $SiO_2$-½$Al_2O_3$ is preferably 57.5% by mass or less.

(13) In the cover glass (B) according to any one of Items (8) to (12), the compressive-stress layer preferably has a compressive stress of 400 MPa or greater and a surface stress depth of layer of 20 μm or greater.

(14) The cover glass (B) according to any one of Items (8) to (13) preferably contains more than 0% by mass and less than or equal to 10% by mass of $K_2O$.

(15) Another aspect of the invention relates to a method for producing a cover glass (B), involving:

(i) preparing molten glass by melting a glass raw material;
(ii) forming the prepared molten glass into a plate-like shape by a down-draw process and thereby obtaining a glass substrate having a glass composition containing
45% to 70% by mass of $SiO_2$,
5% to 25% by mass of $Al_2O_3$,
9% to 25% by mass of $Na_2O$,
more than 0% by mass and less than or equal to 2.5% by mass of $Li_2O$,
0% to 3% by mass of $B_2O_3$, and
more than 0% by mass and less than or equal to 10% by mass of MgO; and
(iii) forming a compressive-stress layer on the surface of the glass substrate.

(16) In the method for producing a cover glass (B) according to Item (15), preferably, a compressive-stress layer having a compressive stress of 400 MPa or greater and a surface stress depth of layer of 20 μm or greater is formed in said step of forming the compressive-stress layer.

According to the present invention, it is possible to produce a cover glass whose compressive-stress layer can be measured more easily, and it is also possible to produce a cover glass efficiently and with improved ion exchangeability.

According to another aspect of the invention, it is possible to provide a cover glass having excellent mechanical strength.

Further, ion-exchange performance can be improved and thus sufficient ion-exchange processing can be conducted in a short time, thereby increasing the efficiency of producing cover glass.

DETAILED DESCRIPTION OF THE PREFERRED EMBODIMENTS

The term "cover glass" is used herein to refer to one of the applications of strengthened glass. For example, "cover glass" refers to components for protecting display screens etc. of portable electronic equipment, such as mobile phones, PDAs, digital cameras, and FPDs, components for protecting solar cells, and components used in casings of mobile terminals etc. Herein, "components for protecting display screens" may serve also as touchscreens.

The term "strengthened glass" refers to a glass plate after chemical strengthening. The term "glass substrate" refers to a glass plate before chemical strengthening.

Cover Glass:

The cover glass of the present embodiment has a compressive-stress layer on the principal surfaces thereof as well as the end surfaces thereof.

Composition of Cover Glass (A):

The glass composition of the cover glass (A) preferably includes
45% to 80% by mole of $SiO_2$,
3% to 25% by mole of $Al_2O_3$,
3% to 30% by mole of $Na_2O$,
more than 0% by mole and less than 4% by mole of $Li_2O$,
0% to 10% by mole of $K_2O$, and
0% to 10% by mole of $B_2O_3$.

An even more preferable glass composition is as provided in Item (1) described above.

Composition of Cover Glass (B):

The glass composition of the cover glass (B) preferably includes
45% to 75% by mass of $SiO_2$,
3% to 25% by mass of $Al_2O_3$,
3% to 30% by mass of $Na_2O$,
more than 0% by mass and less than or equal to 2.5% by mass of $Li_2O$, 0% to 10% by mass of $B_2O_3$, and 0% to 15% by mass of MgO.

An even more preferable glass composition is as provided in Item (8) described above.

$SiO_2$:

$SiO_2$ is an essential component that constitutes the glass network former to be used for the glass substrate, and has the effect of improving the chemical durability and heat resistance of the glass.

The $SiO_2$ content by percentage may be, for example, 45% to 80% by mole, and from a different standpoint, 40% to 75% by mass.

If the $SiO_2$ content by percentage is below the aforementioned lower limits, the liquidus temperature will become high.

Further, vitrification may become difficult and the aforementioned effects may not be obtained sufficiently, although the etching rate at the time of etching the glass substrate to perform shape-processing thereon tends to increase.

On the other hand, if the $SiO_2$ content by percentage is above the aforementioned upper limits, then the glass is likely to cause devitrification and the melt viscosity will increase significantly, and the glass raw materials will become hard to melt and form. Also, because the melt viscosity will increase, the glass will become hard to homogenize, thereby posing difficulty in mass-producing glass inexpensively by using down-drawing processes. Further, the coefficient of thermal expansion will become too small and will less likely match the coefficients of thermal expansion of peripheral materials such as metals and organic adhesives. Furthermore, the low-temperature viscosity will increase excessively and thus the ion-exchange rate will drop, resulting in that sufficient strength cannot be achieved even with chemical strengthening through ion exchange. Moreover, if the $SiO_2$ content by percentage is above the aforementioned upper limits, the amount of the other components will be relatively reduced, and desired characteristics cannot be obtained.

Note that "low-temperature viscosity" refers to the temperature at $10^{7.6}$ to $10^{14.5}$ dPa·s, but in the present embodiment, it is defined as indicating the viscosity at $10^{14.5}$ dPa·s.

Accordingly, the $SiO_2$ content by percentage is suitably 50% to 70% by mole, preferably 53% to 67% by mole, more preferably 53% to 65% by mole, 55% to 65% by mole, and even more preferably 58% to 63% by mole.

From a different standpoint, the $SiO_2$ content by percentage is suitably 50% to 70% by mole, preferably 53% to 67% by mole, more preferably 58% to 67% by mole, 60% to 67% by mole, and even more preferably 63% to 67% by mole.

From a different standpoint, the $SiO_2$ content by percentage is suitably 45% to 70% by mass, preferably 50% to 68% by mass, more preferably 53% to 67% by mass, even more preferably 55% to 65% by mass, and particularly preferably 60% to 65% by mass.

$Al_2O_3$:

$Al_2O_3$ is a component essential to the glass to be used for the glass substrate, and has the effect of improving the chemical durability and heat resistance of the glass and of improving the ion-exchange performance and the etching rate at the time of performing shape-processing by etching.

The $Al_2O_3$ content by percentage may be, for example, 3% to 25% by mole, and from a different standpoint, 3% to 25% by mass.

If the $Al_2O_3$ content by percentage is below the aforementioned lower limits, the aforementioned effects cannot be obtained sufficiently.

On the other hand, if the $Al_2O_3$ content by percentage is above the aforementioned upper limits, the liquidus temperature of the glass will become high and the glass will become hard to form. Thus, it becomes difficult to mass-produce glass inexpensively by using down-drawing processes. Further, the acid resistance will become excessively poor, which is not preferable for a cover glass, and moreover, the glass is likely to cause devitrification and the devitrification resistance will deteriorate as well, which will make down-draw processing inapplicable.

Accordingly, the $Al_2O_3$ content by percentage is preferably 3% to 20% by mole, more preferably 3% to 17% by mole, even more preferably 3% to 15% by mole, and particularly preferably 6% to 11% by mole.

From a different standpoint, the $Al_2O_3$ content by percentage is suitably 5% to 25% by mass, preferably 7% to 20% by mass, more preferably 8% to 18% by mass, even more preferably 9% to 16% by mass, and 10% to 14% by mass, and particularly preferably 11% to 13% by mass.

Furthermore, it is preferable that, if the content by percentage (by mole) of $SiO_2$ is X % and the content by percentage (by mole) of $Al_2O_3$ is Y %, X−(½·Y) is 70% by mole or less, and more preferably 64% by mole or less. If X−½·Y is 70% by mole or less, the etching rate of the glass substrate can be improved effectively. The preferable range for X−½·Y is more preferably 63% by mole or less, even more preferably 62% by mole or less, and further more preferably 61.5% by mole or less.

On the other hand, if X−½·Y is below 45% by mole, the liquidus temperature will rise and thus the devitrification resistance will deteriorate, although the etching rate will reach 5 μm/minute or higher. Therefore, in order to achieve both an improvement in devitrification resistance and an improvement in etching rate, X−½·Y is preferably 40% by mole or greater, more preferably 50% by mole or greater, even more preferably 55% by mole or greater, and particularly preferably 57% by mole or greater.

Accordingly, X−½·Y is, for example, preferably 45% to 70% by mole, or preferably 50% to 64% by mole, 55% to 63% by mole, 55% to 62% by mole, or 57% to 61.5% by mole.

Also, it is preferable that, if the content by percentage (by mass) of $SiO_2$ is X % and the content by percentage (by mass) of $Al_2O_3$ is Y %, X−(½·Y) is preferably 65% by mass or less, more preferably 57.5% by mass or less, and even more preferably 57% by mass or less. Thus, it is possible to balance the formability of the glass and the etching rate.

On the other hand, if X−½·Y is below 30% by mass, the liquidus temperature will rise and thus the devitrification resistance will deteriorate, although the etching rate will reach 5 μm/minute or higher. Therefore, in order to achieve both an improvement in devitrification resistance and an improvement in etching rate, X−½·Y is preferably 30% by mass or greater, more preferably 40% by mass or greater, 45% by mass or greater, 50% by mass or greater, and particularly preferably 55% by mass or greater.

Accordingly, X−½·Y is, for example, preferably 30% to 65% by mass, or preferably 40% to 60% by mass, 45% to 57.5% by mass, or 50% to 57% by mass.

$Na_2O$:

$Na_2O$ is one of the ion-exchange components and is an essential component that reduces the high-temperature viscosity of the glass to be used for the glass substrate and that improves the meltability and formability of the glass. Further, $Na_2O$ is a component that improves the devitrification resistance of the glass.

The $Na_2O$ content by percentage may be, for example, 3% to 30% by mole, and from a different standpoint, 3% to 30% by mass.

If the $Na_2O$ content by percentage is below the aforementioned lower limits, the meltability of the glass will deteriorate, which will increase the cost for melting. Further, the ion-exchange performance between the Na ions contained in the glass and the K ions, with a larger ionic radius, contained in the molten salt (the ion-exchange salt) will also deteriorate, resulting in that a compressive-stress layer having sufficient strength cannot be formed on the glass surface. Furthermore, the coefficient of thermal expansion will be too small and will less likely match the coefficients of thermal expansion of peripheral materials such as metals and organic adhesives. Moreover, the glass is likely to cause devitrification and the devitrification resistance will deteriorate as well, which will make down-draw processing inapplicable and thereby pose difficulty in mass-producing glass inexpensively.

On the other hand, if the $Na_2O$ content by percentage is above the aforementioned upper limits, then the chemical durability of the glass will deteriorate. Moreover, the coefficient of thermal expansion will be too large and will less likely match the coefficients of thermal expansion of peripheral materials such as metals and organic adhesives.

Accordingly, the $Na_2O$ content by percentage is suitably 5% to 25% by mole, preferably 5% to 24% by mole, more preferably 9% to 23% by mole, even more preferably 10% to 20% by mole, further more preferably greater than 12% by mole, preferably greater than 12% by mole to 20% by mole, and particularly preferably from 14% to 18% by mole.

From a different standpoint, the $Na_2O$ content by percentage is suitably 9% to 25% by mass, preferably 9% to 23% by mass, more preferably 10% to 20% by mass, even more preferably 12% to 18% by mass, further more preferably 13% to 17% by mass, and particularly preferably 15% to 17% by mass.

Thus, it is possible to strike a balance among the meltability of the glass and the formability of the glass.

$Li_2O$:

$Li_2O$ is one of the ion-exchange components and is a component that reduces the viscosity of the glass to be used for the glass substrate and that improves the meltability and formability of the glass. $Li_2O$ is also a component that improves the Young's modulus of the glass substrate. Further, $Li_2O$ can effectively lower the glass transition point and the strain point, and thus lower the ion-exchange processing temperature. Thus, it is possible to prevent the ion-exchange processing temperature from exceeding the decomposition temperature of the ion-exchange salt. Further, by introducing $Li_2O$ in trace amounts, the total amount of alkali metal oxides can be reduced, and thus the chemical durability of the glass substrate can be improved. Moreover, $Li_2O$ can reduce the coefficient of thermal expansion of the glass. Also, Li ions, with their small ionic radius, can be ion-exchanged with both Na ions and K ions, and are thus effective in forming a compressive-stress layer on the surface of chemically-strengthened glass prepared by using a molten salt (ion-exchange salt) containing K ions.

On the other hand, if the $Li_2O$ content by percentage is too large, there will be a disadvantage that the ion-exchange salts will deteriorate too soon in the ion-exchange process, which is the step of strengthening the glass substrate, thereby tending to cause an increase in the production cost of the cover glass. Furthermore, if the $Li_2O$ content by percentage is too large, the thermal shock resistance of the glass will deteriorate, and the coefficient of thermal expansion will become too small and will less likely match the coefficients of thermal expansion of peripheral materials such as metals and organic adhesives. Moreover, not only will the heat resistance deteriorate excessively, but also the low-temperature viscosity will drop excessively; this may cause stress relaxation in the heating step after chemical strengthening and may reduce the stress value of the compressive-stress layer. Also, if the $Li_2O$ content becomes too large, then it becomes impossible to observe, in the ion-exchanged strengthened glass, a fringe pattern caused by the refractive index, thus making it impossible to measure the compressive-stress value and the surface stress depth of layer while retaining the shape of the strengthened glass. Even if a faint fringe pattern could be observed, that still would not allow the correct measurement of the compressive-stress value and the surface stress depth of layer.

Also, an increase in the Li ion concentration of the molten salt (ion-exchange salt) used for chemical strengthening will inhibit ion exchange and thus impair the compressive stress, and may also degrade the molten salt (ion-exchange salt) during chemical strengthening.

The $Li_2O$ content by percentage may be, for example, greater than 0% to less than 4% by mole, and from a different standpoint, greater than 0% to 2.5% by mass.

Particularly for the glass composition (A), it is suitable that the $Li_2O$ content by percentage is greater than 0% by mole—i.e., that the glass composition contains $Li_2O$—and the $Li_2O$ content is preferably 0.001% by mole or greater, more preferably 0.1% by mole or greater, and even more preferably 0.2% by mole or greater. Also, the $Li_2O$ content is suitably 2.5% by mole or less, preferably less than 1.0% by mole, more preferably less than 0.8% by mole, even more preferably 0.6% by mole or less, and particularly preferably 0.5% by mole or less.

Accordingly, the $Li_2O$ content by percentage may be, for example, greater than 0% to 2.5% by mole, or preferably 0.001% to 2.5% by mole, 0.001% to less than 1.0% by mole, 0.1% to less than 0.8% by mole, 0.2% to 0.6% by mole, or 0.2% to 0.5% by mole.

Particularly for the glass composition (B), it is suitable that the $Li_2O$ content by percentage is greater than 0% by mass—i.e., that the glass composition contains $Li_2O$—and 2.5% by mass or less, preferably greater than 0% by mass and less than or equal to 2% by mass, more preferably greater than 0% by mass and less than or equal to 1.5% by mass, even more preferably greater than 0% by mass and less than or equal to 1% by mass, further more preferably greater than 0% by mass and less than or equal to 0.5% by mass, and particularly preferably 0.1% by mass to 0.5% by mass, or 0.2% by mass to 0.5% by mass.

$K_2O$:

$K_2O$ is an optional component that can improve the ion-exchange performance of the glass substrate. $K_2O$ also reduces the high-temperature viscosity of the glass, improves the meltability and formability thereof, and also improves the devitrification resistance. Also, $K_2O$ is a component that is more likely to improve the strain point compared to other alkali components. $K_2O$ also increases the depth of the compressive-stress layer formed at the time of chemical strengthening by the ion-exchange between Na ions and K ions.

If the glass contains only $Na_2O$ as the alkali component, then ion exchange between water in the environment that comes into contact with the glass and the alkali ions in the glass is prone to advance, which may deteriorate the chemical durability of the glass. By mixing $K_2O$, the elution of Na ions can be prevented due to the mixed alkali effect, and the chemical durability can be improved.

However, if the $K_2O$ content by percentage is too high, the compressive stress created at the time of chemical strengthening by the ion-exchange between Na ions and K ions tends to become low. Also, the low-temperature viscosity will decrease, and the coefficient of thermal expansion will become too large and will less likely match the coefficients of thermal expansion of peripheral materials such as metals and organic adhesives. Further, the devitrification resistance tends to deteriorate due to the loss of balance in the glass. So, in cases where glass substrates are produced by down-draw processing, it is not preferable to include too much $K_2O$, which will impair devitrification resistance.

The $K_2O$ content by percentage may be, for example, 0% to 10% by mole, and from a different standpoint, 0% to 15% by mass.

Particularly for the glass composition (A), the $K_2O$ content by percentage is suitably 5.5% by mole or less, preferably 4.0% by mole or less, preferably 3.6% by mole or less, preferably 2.6% by mole or less, more preferably 2.4% by mole or less, even more preferably 2.0% by mole or less, and particularly preferably 1.9% by mole or less. $K_2O$ does not necessarily have to be contained because it is an optional component, but the content thereof is preferably greater than 0% by mole—i.e., it is preferable that the glass composition contains $K_2O$—and more preferably 0.1% by mole or greater, more preferably 1.0% by mole or greater, and even more preferably 1.2% by mole or greater.

Accordingly, the $K_2O$ content by percentage may be, for example, 0% to 5.5% by mole, or preferably greater than 0% to 5.5% by mole, 0.1% to 4.0% by mole, 0.5% to 3.6% by mole, 1.0% to 2.6% by mole, 1.0% to 2.4% by mole, 1.0% to 2.0% by mole, or 1.2% to 1.9% by mole.

Particularly for the glass composition (B), the $K_2O$ content by percentage is suitably 0% by mass to 15% by mass, preferably 0% by mass to 10% by mass, more preferably greater than 0% by mass and less than or equal to 10% by mass, even more preferably 0.5% to 8% by mass, further more preferably 0.5% to 5% by mass, and particularly preferably 1% to 4% by mass, or 1% to 3% by mass.

By including $K_2O$, the time required for the ion-exchange processing can be shortened—and especially, the ion-exchange processing at low temperatures can be improved—and thus the productivity of cover glass can be improved.

From a different standpoint, by limiting the $K_2O$ content by percentage, an increase in the coefficient of linear thermal expansion can be prevented.

$Na_2O+Li_2O+K_2O$:

The total content by percentage of $Na_2O$, $Li_2O$, and $K_2O$ may be, for example, 3% to 35% by mole, and from a different standpoint, 3% to 35% by mass.

If the total content by percentage of $Na_2O$, $Li_2O$, and $K_2O$ is below the aforementioned lower limits, ion exchange will not be performed sufficiently, and thus the glass cannot be provided with sufficient strength and will be less suitable as cover glass. In other words, the aforementioned alkali metals are components essential to or promoting chemical strengthening; if the total content by percentage is too small, then the time for chemical strengthening will become longer, thereby impairing production efficiency.

A too-large content by percentage of $Na_2O$, $Li_2O$, and $K_2O$ is also not preferable, as weathering may occur due to the alkali components in the glass. Also, the chemical durability of the glass may deteriorate and the strain point of the glass may drop significantly.

Particularly for the glass composition (A), the total content by percentage of $Na_2O$, $Li_2O$, and $K_2O$ is suitably 8% by mole or greater, 10% by mole or greater, preferably 12% by mole or greater, preferably 14% by mole or greater, particularly 15.5% by mole or greater, more preferably 16% by mole or greater, and even more preferably 17% by mole or greater. The total content is preferably 30% by mole or less, more preferably 25% by mole or less, preferably 22% by mole or less, more preferably 20.5% by mole, and even more preferably 20% by mole or less.

Accordingly, the total content by percentage of $Na_2O$, $Li_2O$, and $K_2O$ may be 8% to 30% by mole, 10% to 25% by mole, 12% to 22% by mole, 14% to 20.5% by mole, or 15.5% to 20% by mole.

Particularly for the glass composition (B), the total content by percentage of $Li_2O$, $Na_2O$, and $K_2O$ is suitably 30% by mass or less, preferably 9% to 30% by mass, more preferably 12% to 27% by mass, even more preferably 14% to 25% by mass, further more preferably 15% to 23% by mass, and particularly preferably 16% to 22% by mass, or 17% to 20% by mass.

Thus, ion exchange can be performed efficiently and sufficiently, and sufficient strength can be obtained. Also, it is possible to prevent the liquidus temperature from rising due to the loss of balance in the glass, to achieve both mechanical strength and devitrification resistance, and to improve productivity. Further, by adjusting the amount of alkali metal oxides added to fall within the aforementioned suitable ranges, the chemical durability of the glass can be improved and weathering can be prevented.

$Li_2O/(Na_2O+Li_2O+K_2O)$:

The ratio between $Li_2O$ and the sum of $Na_2O$, $Li_2O$, and $K_2O$ ("$Li_2O/(Na_2O+Li_2O+K_2O)$") may be greater than 0 and less than or equal to 0.4 on a percentage-by-mole basis, and from a different standpoint, greater than 0 and less than or equal to 0.3 on a percentage-by-mass basis.

Particularly for the glass composition (A), the ratio of $Li_2O/(Na_2O+Li_2O+K_2O)$ on a percentage-by-mole basis is suitably greater than 0, preferably 0.0005 or greater, more preferably 0.001 or greater, even more preferably 0.002 or greater, and particularly preferably 0.005 or greater. The content is suitably 0.2 or less, preferably 0.1 or less, more preferably 0.05 or less, and preferably 0.045 or less.

Accordingly, the ratio of $Li_2O/(Na_2O+Li_2O+K_2O)$ on a percentage-by-mole basis may be greater than 0 to 0.2, or preferably 0.0005 to 0.1, 0.001 to 0.05, 0.002 to 0.05, or 0.005 to 0.045.

Particularly for the glass composition (B), the ratio of $Li_2O/(Li_2O+Na_2O+K_2O)$ on a percentage-by-mass basis is preferably 0.15 or less.

By adjusting the ratio of $Li_2O/(Na_2O+Li_2O+K_2O)$ to fall within the aforementioned ranges, the fringe pattern caused by the refractive index of the chemically-strengthened cover glass can be observed, and thus the surface compressive-stress value and the surface stress depth of layer can be measured nondestructively. Because the surface compressive-stress value and the surface stress depth of layer can be measured easily, predetermined characteristics/properties related to compressive stress can be inspected efficiently, and excellent quality management can be achieved.

Also, the strain point and Tg can be kept from rising, and the ion exchangeability at low temperatures can be improved, and also the coefficient of linear thermal expansion can be prevented from increasing. In addition, the ion-exchange salts used in the chemical strengthening process can be prevented from deteriorating.

$Na_2O/(Li_2O+Na_2O+K_2O)$:

The ratio between $Na_2O$ and the sum of $Li_2O$, $Na_2O$, and $K_2O$ ("$Na_2O/(Li_2O+Na_2O+K_2O)$") may be 0.8 to 0.99 on a percentage-by-mole basis, and from a different standpoint, 0.6 to 0.98 on a percentage-by-weight basis.

If the ratio of $Na_2O/(Li_2O+Na_2O+K_2O)$ is too large, the mixed alkali effect may not be achieved, and the chemical durability of the glass may deteriorate significantly.

Particularly for the glass composition (A), the ratio of $Na_2O/(Li_2O+Na_2O+K_2O)$ on a percentage-by-mole basis is preferably 0.8 to 0.99, and more preferably 0.8 to 0.98.

Particularly for the glass composition (B), the ratio of $Na_2O/(Li_2O+Na_2O+K_2O)$ on a percentage-by-mass basis is preferably 0.6 to 0.99, and more preferably 0.6 to 0.98.

By adjusting the ratio of $Na_2O/(Li_2O+Na_2O+K_2O)$ to fall within the aforementioned ranges, the chemically-strengthened glass prepared by the ion exchange between Na and K can be provided with a favorable surface compressive stress.

The cover glass of the present embodiment may optionally contain other components, such as $B_2O_3$, MgO, CaO, and $ZrO_2$, in the glass composition.

$B_2O_3$:

$B_2O_3$ is an optional component that decreases the viscosity of the glass and that promotes the melting and refining of the glass to be used for the glass substrate.

The $B_2O_3$ content by percentage may be, for example, 0% to 10% by mole, and from a different standpoint, 0% to 10% by mass.

Particularly for the glass composition (A), the $B_2O_3$ content by percentage is suitably 0% to less than 3% by mole, preferably 0% to 2% by mole, more preferably 0% to 1% by mole, more preferably 0% to 0.1% by mole, and particularly preferably less than 0.01% by mole, and it is preferable that $B_2O_3$ is intentionally not contained except for impurities.

Particularly for the glass composition (B), the $B_2O_3$ content by percentage is suitably 0% to 3% by mass, preferably 0% to 2% by mass, more preferably 0% to 1% by mass, even more preferably 0% to 0.1% by mass, and further more preferably less than 0.01% by mass, and it is preferable that $B_2O_3$ is intentionally not contained except for impurities.

By adjusting the $B_2O_3$ content to fall within the aforementioned ranges, it is possible to make the glass homogeneous, prevent unevenness in the glass—and the ensuing unevenness in etching—due to volatilization, and achieve highly accurate shape-processing, and also prevent the deformation of glass during heat treatment resulting from the lowering of the strain point.

MgO:

MgO is an optional component that decreases the viscosity of the glass to be used for the glass substrate and that promotes the melting and refining of the glass. MgO is also effective in improving the meltability of the glass without reducing the alkali-ion exchange rate at the time of ion exchange. Also, among alkaline-earth metals, MgO is an effective component for improving the meltability while making the glass lightweight, because it only increases the glass density by a small rate. MgO also improves formability, increases the strain point and Young's modulus of the glass, and has the effect of lowering the glass transition temperature. Furthermore, when MgO-containing glass is etched by using e.g. hydrofluoric acid, the degree of solubility of precipitates that are formed is high and the rate at which precipitates are produced is relatively low, and therefore, it is relatively less likely for the crystallized deposition to adhere to the glass surface during etching. Thus, it is preferable to include MgO in order to improve the glass meltability and to increase the etching rate.

However, if the MgO content is too large, then the liquidus temperature of the glass will rise sharply, thereby deteriorating the formability. Also, the devitrification resistance will deteriorate, thus tending to pose difficulty in mass-producing glass inexpensively by using down-drawing processes.

The MgO content by percentage may be, for example, 0% to 20% by mole, and from a different standpoint, 0% to 15% by mass.

Particularly for the glass composition (A), the MgO content by percentage is suitably 0% to 15% by mole, preferably 1% to 15% by mole, preferably 3% to 15% by mole, more preferably 3% to 12% by mole, even preferably 3% to 10% by mole, preferably 5% to 10% by mole, and more preferably greater than 6% up to 10% by mole.

Particularly for the glass composition (B), it is suitable that the MgO content by percentage is greater than 0% by mass—i.e., that the glass composition contains MgO—and 10% by mass or less, preferably 1% to 10% by mass, more preferably 2% to 9% by mass, even more preferably 3% to 8% by mass, further more preferably 4% to 7% by mass, and particularly preferably 4% to 6% by mass.

By adjusting the MgO content to fall within the aforementioned ranges, the glass can be molten at lower temperatures, thereby allowing further reductions in the cost for producing the cover glass. Furthermore, because it is possible to improve the ion-exchange performance and increase the strain point at the same time, the MgO-containing glass becomes suitable for cover glass that requires high mechanical strength. This is because a sufficient compressive-stress layer can be formed on the surface of the glass substrate, and the compressive-stress layer formed on the surface can be prevented from being lost or causing stress relaxation, even during/after thermal treatment.

$MgO/(Li_2O+Na_2O+K_2O)$:

The inclusion of an appropriate amount of MgO can improve the weather resistance of the glass, improve meltability, and promote ion exchange. On the other hand, adding too much alkali metals will deteriorate weather resistance and significantly lower the strain point of the glass. Therefore, it is necessary to adjust the ratio between MgO and the sum of $Li_2O$, $Na_2O$, and $K_2O$ to fall within an appropriate range.

The ratio $MgO/(Li_2O+Na_2O+K_2O)$ may be 0 to 1.5 on a percentage-by-mole basis, and from a different standpoint, 0 to 1 on a percentage-by-mass basis.

If the ratio $MgO/(Li_2O+Na_2O+K_2O)$ is too small, the effect of the alkali metal oxides $(Li_2O+Na_2O+K_2O)$ will become dominant, and the weather resistance will deteriorate. Also, the strain point of the glass will drop significantly, thus impairing the heat resistance of the glass.

On the other hand, if the ratio $MgO/(Li_2O+Na_2O+K_2O)$ is too large, the liquidus temperature will rise, and the devitrification stability of the glass will deteriorate significantly.

Particularly for the glass composition (A), the ratio $MgO/(Li_2O+Na_2O+K_2O)$ on a percentage-by-mole basis is suitably 0.11 or greater, preferably 0.11 to 1.2, more preferably 0.15 to 1.2, even preferably 0.2 to 1.0, and particularly preferably 0.2 to 0.8.

Particularly for the glass composition (B), the ratio $MgO/(Li_2O+Na_2O+K_2O)$ on a percentage-by-mass basis is suitably 0.11 or greater, preferably 0.11 to 0.8, more preferably 0.15 to 0.6, even preferably 0.2 to 0.6, and particularly preferably 0.2 to 0.5.

CaO:

CaO is an optional component that decreases the viscosity of the glass to be used for the glass substrate and that promotes the melting and refining of the glass. Also, among alkaline-earth metals, CaO is an effective component for improving the meltability while making the glass lightweight, because it only increases the glass density by a small rate. CaO also improves formability and increases the strain point and Young's modulus of the glass. Also, CaO is effective in improving the meltability of the glass without sharply increasing the liquidus temperature of the glass, and may be introduced by replacing a portion of MgO. Furthermore, CaO has the effect of reducing the alkali-ion exchange rate at the time of ion exchange.

However, if the CaO content is too large, then the devitrification resistance will deteriorate, thus tending to pose difficulty in mass-producing glass inexpensively by using down-drawing processes. Also, the ion-exchange performance and etching efficiency tend to deteriorate. Further, precipitates that are formed when glass containing large amounts of CaO is etched by using e.g. hydrofluoric acid are more likely to adhere to the surface of the glass being etched as compared to MgO for example, because the precipitates have a low degree of solubility and an extremely high precipitation rate. If the amount of precipitates adhering to the glass surface is too large, the etching reaction will be inhibited and the etching rate will drop, thereby impairing the glass-processing quality.

The CaO content by percentage may be, for example, 0% to 15% by mole, and from a different standpoint, 0% to 15% by mass.

Particularly for the glass composition (A), the CaO content by percentage is suitably 0% to 10% by mole, preferably 0% to 8% by mole, more preferably 0% to 6% by mole, more preferably 0% to 4% by mole, and even more preferably 0% to 1% by mole.

Particularly for the glass composition (B), the CaO content by percentage is suitably 0% to 2% by mass, preferably 0% to 1% by mass, more preferably 0% to 0.5% by mass, even more preferably 0% to 0.1% by mass, and further more preferably less than 0.01% by mass, and it is preferable that CaO is intentionally not contained except for impurities.

Note that in cases where an extremely-high etching quality is required, it is preferable that substantially no CaO is contained.

Further, it is preferable to include both MgO and CaO in order to reduce the melt viscosity and the liquidus temperature.

SrO and BaO:

The total content by percentage of SrO and BaO may be 0% to 10% by mass, for example.

SrO and BaO are optional components that decrease the viscosity of the glass and that promote the melting of the glass and refining of the molten glass. SrO/BaO may be introduced by replacing a portion of MgO. By replacing a portion of MgO with SrO/BaO, the liquidus temperature of the glass can be lowered.

However, by including SrO and/or BaO, the glass density increases, and it becomes difficult to make the cover glass lightweight. Further, including SrO and/or BaO in large amounts will reduce the alkali-ion exchange rate at the time of ion exchange.

Particularly for the glass composition (A), the total content by percentage of SrO and BaO is preferably 3% by mole or less, and more preferably 1% by mole or less, and it is more preferable that substantially no SrO or BaO is contained. Accordingly, the total content by percentage of SrO and BaO is preferably 0% to 3% by mole, and more preferably 0% to 1% by mole, and it is more preferable that substantially no SrO or BaO is contained.

SrO, BaO, and ZnO:

The total content by percentage of SrO, BaO, and ZnO may be, for example, 0% to 10% by mass.

Particularly for the glass composition (B), the total content by percentage of SrO, BaO, and ZnO is preferably 0% to 5% by mass, more preferably 0% to 3% by mass, and even more preferably 0% to 1% by mass.

From the standpoint of effectively preventing the glass density from increasing and the ion-exchange rate from decreasing, the total content by percentage of SrO and BaO is preferably 3% by mass or less, more preferably 1% by mass or less, and preferably less than 0.01% by mass, and it is more preferable that substantially no SrO or BaO is contained. Accordingly, the total content by percentage of SrO and BaO is preferably 0% to 3% by mass, preferably 0% to 1% by mass, and more preferably 0% to 0.01% by mass, and it is more preferable that substantially no SrO or BaO is contained.

MgO+CaO+SrO+BaO:

The total content by percentage of MgO, CaO, SrO, and BaO may be, for example, 0% to 20% by mole, and from a different standpoint, 0% to 15% by mass.

If the total content by percentage of MgO, CaO, SrO, and BaO exceeds 15% by mass, the chemical durability of the glass will deteriorate. On the other hand, by including these components, the meltability and the heat resistance of the glass can be improved.

Particularly for the glass composition (A), the total content by percentage of MgO, CaO, SrO, and BaO is suitably 3% to 20% by mole, preferably 3% to 18% by mole, more preferably 5% to 15% by mole, and even more preferably 6% to 13% by mole.

Particularly for the glass composition (B), the total content by percentage of MgO, CaO, SrO, and BaO is suitably 0% to 15% by mass, preferably 0% to 10% by mass, more preferably 0% to 7% by mass, even more preferably 2% to 7% by mass, further more preferably 3% to 7% by mass, and particularly preferably 4% to 7% by mass.

$ZrO_2$:

$ZrO_2$ is an optional component that significantly improves the ion-exchange performance and that increases the strain point and the viscosity near the liquidus temperature of the glass. Further, $ZrO_2$ improves the heat resistance and the chemical durability of the glass, and is also effective in increasing the dynamic elastic modulus.

However, if the $ZrO_2$ content is too large, the liquidus temperature may rise and the devitrification resistance may deteriorate. Also, the liquidus temperature of the glass will rise significantly. Further, because $ZrO_2$ has a high melting point and is hard to melt, a portion of the raw material may accumulate at the bottom of the melting furnace. If such non-molten components are mixed into the glass matrix, they may form inclusions and deteriorate the glass quality.

The $ZrO_2$ content by percentage may be, for example, 0% to 8% by mole, and from a different standpoint, 0% to 15% by mass.

Particularly in the glass composition (A), in order to prevent a reduction in devitrification resistance, the $ZrO_2$ content by percentage is preferably 0% to 8% by mole, more preferably 0% to 6% by mole, even more preferably 0% to 4% by mole, and further more preferably 0% to 2% by mole.

Meanwhile, by including $ZrO_2$, it is possible to effectively improve heat resistance, which is important for cover glass used in mobile phones and for cover glass used in touch-panel displays etc., and to effectively improve ion-exchange performance, which relates to the reduction of time for chemically strengthening the glass substrate and to the improvement of the mechanical strength thereof. Therefore, the $ZrO_2$ content by percentage is suitably 0.1% by mole or greater, preferably 0.5% by mole or greater, more preferably 1% by mole or greater, and even more preferably 1.5% by mole or greater. Accordingly, the $ZrO_2$ content by percentage is suitably 0.1% to 6% by mole, preferably 0.5% to 4% by mole or greater, and more preferably 1% to 2% by mole.

On the other hand, if the glass density is to be reduced, then it is preferable that the $ZrO_2$ content by percentage is less than 0.1% by mole, and it is particularly preferable that $ZrO_2$ is intentionally not contained except for impurities.

Particularly for the glass composition (B), the $ZrO_2$ content by percentage is preferably 0% to 5% by mass, more preferably 0% to 3% by mass, even more preferably 0% to 1% by mass, and more preferably less than 0.01% by mass, and it is even more preferable that $ZrO_2$ is intentionally not contained except for impurities.

$TiO_2$:

$TiO_2$ is an optional component that significantly improves the ion-exchange performance and that reduces the high-temperature viscosity of the glass. $TiO_2$ also improves the heat resistance and the chemical durability of the glass. Further, $TiO_2$ increases the strain point and the viscosity near the liquidus temperature of the glass, and is also effective in increasing the dynamic elastic modulus.

However, if the $TiO_2$ content is too large, the devitrification resistance will deteriorate. Further, the UV transmittance will deteriorate and the glass will be stained, which is not suitable for cover glass or the like. Furthermore, there will be a disadvantage that, in the case of carrying out a process using a UV-curable resin, the resin cannot be cured sufficiently.

So, the $TiO_2$ content by percentage may be, for example, 0% to 10% by mole, and from a different standpoint, 0% to 10% by mass.

Particularly for the glass composition (A), the $TiO_2$ content by percentage is preferably 0% to 8% by mole, more preferably 0% to 5% by mole, even more preferably 0% to 3% by mole, and more preferably less than 0.01% by mole, and it is even more preferable that $TiO_2$ is intentionally not contained except for impurities.

Particularly for the glass composition (B), the $TiO_2$ content by percentage is preferably 0% to 5% by mass, more preferably 0% to less than 3% by mass, even more preferably 0% to 1% by mass, and more preferably less than 0.01% by mass, and it is even more preferable that $TiO_2$ is intentionally not contained except for impurities.

Refining Agents:

The cover glass of the present embodiment may contain refining agents used for refining. The refining agents are not particularly limited as far as they have little burden on the environment and provide the glass with excellent clarity. Examples include one or more types of agents selected from the group of oxides of metals including, for example, Sn, Fe, Ce, Tb, Mo, and W.

Generally, refining agents do not exert their effects at contents less than 0.001% by mole. On the other hand, refining agents may cause devitrification or staining at contents above 1% by mole. Accordingly, the total content by percentage of refining agents is preferably 0.001% to 1% by mole, and from a different standpoint, 0.001% to 1% by mass.

The following ranges are preferable for the metal oxides, the oxides being expressed as $SnO_2$, $Fe_2O_3$, and $CeO_2$.

$SnO_2$ is a component that is prone to devitrify the glass. So, in order to prevent devitrification while improving the clarity, the $SnO_2$ content by percentage is suitably 0% to 0.5% by mole, and preferably 0.01% to 0.5% by mole. From a different standpoint, the $SnO_2$ content by percentage is suitably 0% to 0.8% by mass, preferably 0% to 0.5% by mass, and more preferably 0.01% to 0.5% by mass.

$Fe_2O_3$ is a component that stains the glass. So, in order to achieve a suitable transmittance while improving the clarity, the $Fe_2O_3$ content by percentage is suitably 0% to 0.1% by mole, and preferably 0.01% to 0.05% by mole. From a different standpoint, the $Fe_2O_3$ content by percentage is suitably 0% to 0.2% by mass, preferably 0% to 0.1% by mass, and more preferably 0.01% to 0.05% by mass.

Particularly in cases where transparency and UV transmission characteristics are demanded of the glass, it is preferable that the $Fe_2O_3$ content is less than 0.02% by mole, and particularly preferable that $Fe_2O_3$ is intentionally not contained except for impurities. Also from a different standpoint, it is preferable that the $Fe_2O_3$ content is less than 0.02% by mass, and particularly preferable that $Fe_2O_3$ is intentionally not contained except for impurities.

The $CeO_2$ content by percentage is suitably from 0% to 0.5% by mole, and preferably 0.01% to 0.5% by mole. From a different standpoint, the $CeO_2$ content by percentage is suitably from 0% to 0.8% by mass, preferably 0% to 0.5% by mass, and more preferably 0.01% to 0.5% by mass.

Further, in cases where particularly high transmittance is demanded of glass, such as in a cover glass, it is desirable to employ $SO_3$ as the refining agent. The $SO_3$ content by percentage is suitably from 0% to 0.5% by mole, and preferably 0.001% to 0.5% by mole. From a different standpoint, the $SO_3$ content by percentage is suitably 0% to 0.5% by mass, and preferably 0.001% to 0.5% by mass.

In the case of employing $SO_3$ as a refining agent, the combined use of carbon and a sulfate such as sodium sulfate—serving as the source of $SO_3$—in the melting step can achieve an even higher refining effect.

$As_2O_3$ and $Sb_2O_3$ also have the effect of clarifying glass by causing reactions that involve a change in valance in molten glass. However, these compounds place a heavy burden on the environment. Therefore, in the cover glass of the present embodiment, it is preferable that $As_2O_3$ and $Sb_2O_3$ are substantially not included.

PbO and F have the effect of improving the meltability of the glass and refining same. However, these compounds place a heavy burden on the environment. Therefore, in the cover glass of the present embodiment, it is preferable that PbO and F are substantially not included.

Herein, the expression "substantially not included" means that the content is less than 0.01% by mole or less than 0.001% by weight and that these compounds are intentionally not included except for impurities.

Oxides of rare-earth elements, such as $Nb_2O_5$ and $La_2O_3$, are optional components that increase the Young's modulus of the glass to be used for the glass substrate. However, if the content of these compounds is too large, the devitrification resistance will deteriorate. Therefore, the content by percentage of rare-earth oxides is suitably 3% by mole or less, preferably 1% by mole or less, and more preferably less than 0.1% by mole, and these compounds should intentionally not be included except for impurities. From a different standpoint, the content by percentage of rare-earth oxides is suitably 3% by mass or less, preferably 1% by mass or less, and more preferably less than 0.1% by mass, and these compounds should intentionally not be included except for impurities.

The content of transition metal elements that stain glass, such as Co and Ni, is suitably 1% by mole or less, preferably 0.5% by mole or less, and more preferably less than 0.05% by mole, and such compounds should intentionally not be included except for impurities. From a different standpoint, the content of transition metal elements is suitably 0.1% by mass or less, preferably 0.05% by mass or less, and more preferably less than 0.01% by mass, and such compounds should intentionally not be included except for impurities.

In some sections above, the preferable compositional range was described separately for the glass composition (A) and the glass composition (B). It goes without saying, however, that the preferable compositional range for the glass composition (A) can be employed in combination with the preferable compositional range for the glass composition (B).

Physical Properties of Cover Glass:

The thickness of the cover glass of the present embodiment can be adjusted as appropriate depending on the usage of the cover glass.

For example, the thickness of the strengthened glass to be used as a cover glass is suitably around 3.0 mm or thinner, preferably around 2.0 mm or thinner, more preferably 1.3 mm or thinner, 0.8 mm or thinner, 0.5 mm or thinner, and particularly preferably 0.3 mm or thinner. The smaller the thickness, the more lightweight the strengthened glass can be made, and so the strengthened glass will become suitable for applications such as cover glass and touchscreen display substrates. However, if the thickness of the strengthened glass is too small, then it becomes difficult to obtain a desired strength. So, the thickness is suitably 0.05 mm or greater, preferably 0.1 mm or greater, and more preferably 0.2 mm or greater.

Accordingly, the thickness range may be, for example, 0.05 to 3.0 mm, 0.1 to 2.0 mm, 0.2 to 1.3 mm, 0.2 to 1.0 mm, 0.2 to 0.8 mm, or 0.2 to 0.5 mm.

Note that there is substantially no difference in thickness between the ion-exchanged strengthened glass and the glass substrate to be used for the strengthened glass.

The entire surface of the cover glass has a compressive-stress layer formed thereon. The surface stress depth of layer can be adjusted as appropriate by adjusting the glass composition, the method for the ion-exchange processing, the conditions used therefor, etc. For example, the thickness is suitably 10 μm or greater, preferably 30 μm or greater, and more preferably 50 μm or greater. The greater the surface stress depth of layer, the less likely the glass substrate will break even when a deep scratch is made therein. On the other hand, if an extremely thick compressive-stress layer is formed on the surface of the glass substrate, then the glass may shatter when an extremely deep scratch is made therein. So, it is suitable that the surface stress depth of layer is 150 μm or thinner. Note that, in cases where the thickness of the cover glass is 0.7 mm or thinner, or as thin as 0.5 mm or thinner, then it is suitable for the surface stress depth of layer to be 100 μm or thinner.

Accordingly, the surface stress depth of layer range may be, for example, 10 to 150 μm, 20 to 100 μm, 20 to 85 μm, 30 to 70 μm, or 35 to 65 μm.

The compressive-stress value of the cover glass of the present embodiment is, for example, suitably around 300 MPa or greater, preferably 400 MPa or greater, preferably 500 MPa or greater, preferably 550 MPa or greater, and more preferably 600 MPa or greater.

Accordingly, the compressive-stress value may be, for example, 200 to 1060 MPa, 300 to 950 MPa, 400 to 800 MPa, or 500 to 800 MPa.

By providing the compressive-stress layer with a predetermined thickness and/or a predetermined compressive-stress value, it is possible to produce a cover glass that is thin and also hard to break. In other words, it is possible to provide the cover glass of the present embodiment with a sufficient strength and make it suitable for the protection of displays, for example.

On the other hand, although the glass strength increases with the increase in compressive-stress value, a greater internal tensile stress, which is in equilibrium with the compressive stress, will be created inside the strengthened glass, and this will increase the impact occurring when the strengthened glass is damaged and broken. To reduce this impact, it is suitable for the chemically-strengthened cover glass of the present embodiment to have a compressive-stress value of 950 MPa or less, and preferably 800 MPa or less.

Cover Glass:

Recent years have called for thinner cover glasses to achieve lightweightness. In association with this trend, cover glasses are required to have a compressive-stress value greater than a predetermined value while having a small compressive-stress layer depth. More specifically, it is preferable that the glass thickness is 0.2 to 1.3 mm, the compressive-stress layer depth is 20 to 85 μm, and the compressive-stress value is 200 MPa to 1060 MPa; more preferably the glass thickness is 0.2 to 1.0 mm, the compressive-stress layer depth is 30 to 70 μm, and the compressive-stress value is 300 MPa to 950 MPa; and even more preferably the glass thickness is 0.2 to 0.8 mm, the compressive-stress layer depth is 35 to 65 μm, and the compressive-stress value is 400 MPa to 800 MPa.

In general, the glass substrate to be used for the cover glass of the present embodiment has various characteristics.

Glass Transition Temperature (Tg):

The glass substrate to be used for the cover glass of the present embodiment has a glass transition temperature (Tg) of 500° C. or higher, preferably 510° C. or higher, more preferably 530° C. or higher, and even more preferably 560° C. or higher. Tg can be measured by using, for example, a differential dilatometer known in the art.

For example, the glass transition temperature (Tg) can be measured by processing a glass sample into a circular cylinder 5 mm in diameter and 20 mm long, and measuring the Tg thereof with a differential dilatometer (Thermo Plus2 TMA8310).

By adjusting Tg to be 500° C. or higher, it is possible to keep the heat resistance from being impaired and to prevent the compressive-stress layer, which is formed on the principal surfaces and the end surfaces of the glass substrate by ion-exchange processing, from being lost or causing stress relaxation by thermal treatment carried out in downstream steps, such as the step of forming various films.

On the other hand, the ion-exchange performance deteriorates when Tg is 700° C. or higher. Therefore, Tg is preferably 700° C. or lower, more preferably 650° C. or lower, 630° C. or lower, 620° C. or lower, and even more preferably 600° C. or lower.

Accordingly, Tg may be, for example, 500 to 700° C., 510 to 650° C., 530 to 620° C., or 560 to 600° C.

Etching Rate:

The glass substrate to be used for the cover glass of the present embodiment generally has an etching rate that is suitably 3.0 μm/minute or higher, preferably 3.7 μm/minute or higher, 4.0 μm/minute or higher, and more preferably 4.3 μm/minute or higher. Herein, "etching rate" refers to a value measured from the etched amount (change in thickness) on one surface of the glass substrate when the glass substrate is etched for 20 minutes in an etching environment at 22° C. and containing 10% by mass of hydrogen fluoride.

By adjusting the etching rate to be within the aforementioned range, it is possible to increase the end-surface processing rate etc. achieved through shape-processing and etching of the glass, and to improve productivity.

Note that the productivity of glass products improves with higher etching rates, but the liquidus temperature rises as the $Al_2O_3$ content by percentage is increased to increase the etching rate. So, in order to achieve both devitrification resistance and an increase in etching rate, it is suitable for the glass constituting the glass substrate of the present embodiment to have an etching rate of 10 μm/minute or lower, preferably 8 μm/minute or lower, and more preferably 7 μm/minute or lower.

Accordingly, the etching rate may be, for example, 3.0 to 10 μm/minute, 3.7 to 8 μm/minute, 4 to 8 μm/minute, or 4.3 to 7 μm/minute.

Density:

The glass substrate to be used for the cover glass of the present embodiment has a density that is suitably 2.8 g/cm³ or lower, preferably 2.7 g/cm³ or lower, and more preferably 2.6 g/cm³ or lower. The lower the density, the more lightweight the glass can be made, and so the glass will become suitable for applications such as cover glass and touchscreen display substrates. The density can be measured according to the Archimedean method known in the art.

Coefficient of Linear Thermal Expansion:

The glass substrate to be used for the cover glass of the present embodiment has a coefficient of linear thermal expansion of suitably $50 \times 10^{-7}$ to $120 \times 10^{-7}/°$ C., preferably $60 \times 10^{-7}$ to $120 \times 10^{-7}/°$ C., and more preferably $90 \times 10^{-7}$ to $110 \times 10^{-7}/°$ C., or more preferably $85 \times 10^{-7}$ to $115 \times 10^{-7}/°$ C., in the temperature range of 100° C. to 300° C.

The coefficient of thermal expansion can be measured by using, for example, a differential dilatometer known in the art. For example, the coefficient of thermal expansion can be measured by processing a glass sample into a circular cylinder 5 mm in diameter and 20 mm long, and measuring the thermal expansion coefficient thereof with a differential dilatometer (Thermo Plus2 TMA8310). The average thermal expansion coefficient in the temperature range of 100° C. to 300° C. ($\alpha$) was calculated from the results of measuring the thermal expansion coefficient.

Thus, the coefficient of thermal expansion will likely match the coefficients of thermal expansion of peripheral materials such as metals and organic adhesives, and the peripheral components can be prevented from falling off.

Liquidus Temperature (Tl):

The glass substrate to be used for the cover glass of the present embodiment has a liquidus temperature that is suitably 1200° C. or lower, preferably 1150° C. or lower, preferably 1145° C. or lower, more preferably 1100° C. or lower, preferably 1000° C. or lower, and even more preferably 950° C. or lower. The liquidus temperature can be measured through known methods, and for example, according to the following method.

The glass substrate is pulverized, and glass particles that pass through a 2380-μm sieve but remain on a 1000-μm sieve are immersed into ethanol, subjected to ultrasonic cleaning, and then dried in a constant-temperature oven. Then, 25 g of the glass particles are placed on a 12 mm wide, 200 mm long, 10 mm thick platinum board so that they assume a substantially constant thickness, and are placed in an electric furnace having a temperature gradient from 800° C. to 1200° C. and kept therein for 24 hours. Then, the particles are taken out from the furnace, and devitrification that occurred inside the glass is observed with an optical microscope at a magnification of 40 times. The maximum temperature at which devitrification was observed is found as the liquidus temperature.

The smaller the difference between the liquidus temperature and the glass transition point is, the more the devitrification of glass during production can be prevented (the more the devitrification resistance can be improved). That is, the smaller the difference between the liquidus temperature and the glass transition point is, the more the devitrification resistance can be improved, and the glass becomes more suitable for down-draw processing and the glass substrate can be formed at lower temperatures, which thus allows the reduction of glass production costs.

High-Temperature Viscosity:

The glass substrate to be used for the cover glass of the present embodiment has a high-temperature viscosity (temperature at 200 dPa·s) that is suitably 1700° C. or lower, and preferably 1600° C. or lower.

Thus, it is possible to prevent an increase in melting temperature as well as an increase in thermal load on the glass-production facility, such as the melting furnace. The bubble quality (the content of bubbles) of the glass can also be improved.

The high-temperature viscosity (temperature at 200 dPa·s) of the glass can be found by: melting a glass sample for 4 hours at 1600° C. and removing bubbles therefrom; and measuring the high-temperature viscosity with a pull-down automatic viscometer.

Liquid Phase Viscosity:

The glass substrate to be used for the cover glass of the present embodiment or for chemical strengthening has a liquid phase viscosity of preferably 160000 dPa·s or greater, more preferably 300000 dPa·s or greater, even more preferably 400000 dPa·s or greater, and further more preferably 500000 dPa·s or greater. Such a liquid phase viscosity makes the glass suitable for down-draw processing (especially overflow down-draw processing) and can thus reduce the production cost.

Note that, in order to produce a glass substrate stably through down-draw processing (especially through overflow down-draw processing), it is preferable that the liquid phase viscosity is 160000 dPa·s or greater and the liquidus temperature (devitrification temperature) is 1200° C. or lower. In order to produce chemically-strengthened glass substrates and cover glass more stably while suppressing devitrification, it is preferable that the liquid phase viscosity is 300000 dPa·s or greater and the liquidus temperature is 1100° C. or lower, and more preferable that the liquid phase viscosity is 400000 dPa·s or greater and the liquidus temperature is 1000° C. or lower.

Strain Point:

The glass substrate to be used for the cover glass of the present embodiment has a strain point that is suitably 460° C. or higher, preferably 465° C. or higher, and more preferably 470° C. or higher. The strain point can be found, for example, by: cutting a glass sample into a 3-by-3-by-55-mm right square prism; grinding the glass sample; subjecting the same to measurement by using a beam bending viscometer (product of Tokyo Kogyo Co., Ltd.); and finding the strain point by calculation according to the beam bending method (ASTM C-598).

Thus, it is possible to prevent the heat resistance from being impaired and to prevent the compressive-stress layer, which is formed on the principal surfaces and the end surfaces of the glass substrate by ion-exchange processing, from being lost or causing stress relaxation by thermal treatment carried out in downstream steps, such as the step of forming various films.

On the other hand, the ion-exchange performance deteriorates when the strain point is 660° C. or higher. So, the strain point is suitably 660° C. or lower, preferably 610° C. or lower, more preferably 590° C. or lower, more preferably 585° C. or lower, preferably 570° C. or lower, and even more preferably 550° C. or lower.

Accordingly, the strain point may be, for example, 460 to 660° C., or 460 to 610° C. Particularly for the cover glass (B), the strain point is suitably 465 to 590° C., and preferably 465 to 585° C. For the cover glass (A), the strain point is suitably 470 to 570° C., and preferably 470 to 550° C.

Method for Producing Cover Glass:

A cover glass having the aforementioned glass composition can be produced, for example, by:

(i) preparing molten glass by melting a glass raw material;

(ii) forming the prepared molten glass into a plate-like shape by a down-draw process and thereby obtaining a glass substrate; and (iii) forming a compressive-stress layer on the surface of the glass substrate.

Step (i):

Glass raw materials that provide the aforementioned components are measured and blended together, are placed in a melting pot made, for example, of fire brick, platinum, or a platinum alloy, where they are heated and molten, and then are subjected to refining and homogenization, thereby preparing molten glass having the desired composition as described above.

Step (ii):

The molten glass prepared in Step (i) is then formed into a plate-like shape by a down-draw process.

The down-draw process can be performed according to a known process disclosed, for example, in JP-A-2009-203080. In the down-draw process, molten glass is fed into a trough and is made to flow over both sides thereof. The overflowed molten glass flows downward along both the side surfaces of a forming body having a wedge-shaped cross section and located below the trough, creating two flows of molten glass which join at the lowermost end of the forming body. The joining of the two flows results in a strip of glass, which is drawn by drawing rollers provided below the forming body. Thus, the molten glass is formed into a strip of glass having a predetermined thickness. The strip of glass can be cut into glass substrates.

Various processes are known for forming glass into a plate-like shape, including various down-draw processes, the float process, the re-draw process, and the roll-out process. In the present embodiment, it is suitable to employ the down-draw process, particularly the overflow down-draw process.

By employing the down-draw process, the glass substrates obtained are improved in etching rate, as compared to other forming processes such as the float process.

Also, the principal surfaces of a glass substrate formed by the down-draw process are extremely smooth, because they are made by hot forming. Therefore, the polishing step after forming becomes unnecessary, and thus it is possible to further reduce production costs and improve productivity.

Also, both the principal surfaces of the glass substrate formed by using the down-draw process have a uniform composition, and therefore, there will be no difference in the ion-exchange rate between the principal surfaces during the later-described ion-exchange process. Thus, the glass substrate can be prevented from warping after ion exchange due to a difference in composition. In other words, it becomes possible to produce homogeneous cover glasses, to improve productivity, and to reduce costs.

Also, forming glass by the down-draw process can produce glass substrates with surfaces having no microcracks, which, in turn, can improve the strength of the glass substrates.

Preferably, the plate-shaped glass substrate is processed into a desired shape. For example, the glass substrate may be subjected to shape-processing by etching, or by a physical process such as shape-processing by sandblasting or shape-processing using a cutter or a laser, before the step of forming a compressive-stress layer on the surface of the glass substrate.

The later-described step of forming a compressive-stress layer on the surface of the glass substrate (Step (iii)) may be performed either before or after the shape-processing step. In terms of shape-processability, it is preferable to perform the shape-processing step before the step of forming a compressive-stress layer on the surface of the glass substrate.

An example of employing etching for the shape-processing is described below.

Etching is performed as follows.

(a) First, both the principal surfaces of the plate-shaped glass substrate are coated with a resist material. The resist material to be used is not particularly limited, and it is suitable to use a material that is resistant to the etchant used. For example, glass is, in general, subjected to wet etching using an aqueous solution containing hydrofluoric acid or to dry etching using a fluorine-based gas, so resist materials having excellent resistance to hydrofluoric acid are suitable. As for the etchant, it is possible to suitably use a mixed acid containing, for example, hydrofluoric acid, sulfuric acid, nitric acid, hydrochloric acid, and/or hydrofluorosilicic acid.

(b) Then, the resist material is exposed via a photo mask having a desired shape pattern.

(c) Next, the exposed resist material is developed to thus form a resist pattern on the glass substrate in regions other than the regions-to-be-etched, and then, the regions-to-be-etched on the glass substrate are etched.

The developer for developing the resist material can be selected as appropriate depending on the resist material, the etchant, and the materials used for the glass substrate, and examples include alkali solutions such as KOH or NaOH.

Etching may be done by wet etching or dry etching, but wet etching is more suitable. The glass substrate may simply be immersed into an etching solution, or spray etching, in which the etching solution is sprayed, may be employed.

If a wet etchant is used as the etchant, the glass substrate will be etched isotropically. Thus, each end surface of the glass substrate will be formed so as to have: a central section that projects outward the most; and sloped faces that curve gently from the central section toward the respective principal surfaces. It is preferable that the boundaries between the sloped faces and the respective principal surfaces and the boundary between the two sloped faces are rounded.

By employing etching for performing shape-processing, even complicated shapes can be created easily, just by adjusting the shape of the mask pattern. Further, performing shape-processing by etching can further improve productivity and also cut down processing costs.

Further, both principal surfaces of the glass substrate can be etched evenly at the time of etching the glass substrate from both principal surfaces thereof by employing the resist pattern formed on the principal surfaces of the glass substrate as a mask. In other words, the uniform composition of the glass results in excellent dimensional accuracy in etching.

Further, it is possible to produce a cover glass having extremely smooth end surfaces, making the cross-sectional shape of the end surfaces of the cover glass suitable as cover glass for use in mobile phones etc. and for use in touchscreen displays. More specifically, it is possible to prevent microcracks, which are inevitably created in shape-processing that employs machining, and to thus further improve the mechanical strength of the cover glass.

Step (iii):

Then, a compressive-stress layer is formed on the surface of the glass substrate produced as above.

Physical strengthening or chemical strengthening are known as methods for forming the compressive-stress layer on the surface of the glass substrate, but for the cover glass of the present embodiment, the chemical strengthening method is employed for forming the compressive-stress layer.

The chemical strengthening method involves the introduction of alkali ions with larger ionic radii into the surface of the glass substrate by performing ion-exchange processing at temperatures equal to or below the strain point of the glass.

For example, the glass substrate is rinsed, and is then immersed for about 1 to 25 hours, preferably about 1 to 5 hours, and more preferably 1 to 3 hours, in a treatment bath containing 95% of $KNO_3$ and 5% of $NaNO_3$, or a treatment bath containing 100% of $KNO_3$, kept in a temperature range of around 350° C. to 550° C. (preferably around 400 to 550° C.), to thereby exchange the $Na^+$ ions and/or the $Li^+$ ions on the superficial layer of the glass with $K^+$ ions present in the treatment bath and thus cause chemical strengthening. In this way, the compressive-stress layer can be formed. Note that the temperature and the length of time for the ion-exchange processing and the type and concentration of the ion-exchange salt(s) can be changed as appropriate. For example, the ion-exchange salt may be a single salt, such as potassium nitrate ($KNO_3$) or sodium nitrate ($NaNO_3$), but it is preferable to use a mixed salt thereof.

With the glass substrate having the glass composition of the present embodiment, ion-exchange processing can be carried out in a relatively short time even when the processing is conducted at lower ion-exchange processing temperatures.

Further, the surface stress depth of layer and the compressive-stress value can be measured without destructing the strengthened glass, even when chemical strengthening is carried out using a combined salt.

EXAMPLES

Now, examples of the cover glass of the present embodiment and a method for producing same will be described in further detail below.

Preparation of Glass Substrate:

First, glass raw materials (batches) were prepared by using general glass raw materials, i.e., silica, alumina, sodium carbonate, potassium carbonate, basic magnesium carbonate, lithium carbonate, calcium carbonate, zirconium oxide, boron oxide, and/or refining agents (such as tin oxide or sodium sulfate), so as to provide the glass compositions as shown in Tables 1-1 to 1-6 (Examples 1A to 42A), Tables 2-1 to 2-3 (Examples 1B to 24B), and Tables 1-7 and 2-4 (Comparative Examples 1A, 2A, and 1B to 4B).

Each prepared batch was heated in an electric furnace for 4 hours at 1550° C. with a platinum crucible and was made into molten glass, and then, outside the furnace, the molten glass was spread out onto an iron plate to cool, to thereby prepare a block of glass. The glass block was kept in an electric furnace for 30 minutes at 600° C. (for Examples 1A to 42A and Comparative Examples 1A, 2A) or 500° C. to 700° C. (for Examples 1B to 24B and Comparative Examples 1B to 4B). Then, the furnace was turned off, and the glass block was gradually cooled to room temperature, to thereby obtain a piece of plate-shaped glass. The liquidus temperature, the glass transition temperature, the strain point, the density, and the coefficient of thermal expansion of the glass prepared as above were measured according to the methods described further below. It should be noted that the cover glass obtained by subjecting the glass substrate to chemical strengthening as described below exhibits substantially the same results in terms of liquidus temperature, glass transition temperature, strain point, density, and coefficient of thermal expansion.

Next, the aforementioned glass block was subjected to machining such as cutting and polishing, and made into a 50-by-40-mm glass substrate about 0.7 mm thick.

Then, the glass substrate was rinsed, and was then subjected to chemical strengthening by being immersed for about 2 hours in a treatment bath containing 95% of $KNO_3$ and 5% of $NaNO_3$ (for Examples 1A to 42A and Comparative Examples 1A, 2A), or a treatment bath containing 100% of $KNO_3$ (for Examples 1B to 24B and Comparative Examples 1B to 4B), kept at 450° C. The chemically-strengthened glass was rinsed by being immersed in a rinsing tub and was then dried, to thereby obtain a cover glass.

For each glass substrate prepared as above, the glass transition temperature was measured, and evaluation was made as to whether the measurement of the compressive-stress layer and shape-processing by etching were possible.

Further, for each piece of strengthened glass (cover glass), the compressive-stress value and the surface stress depth of layer were measured. The results are shown in the Tables below. The compositions in Tables 1-1 to 1-7 are shown in percentage by mole. The compositions in Tables 2-1 to 2-4 are shown in percentage by mass.

TABLE 1-1

| | Examples | | | | | | |
|---|---|---|---|---|---|---|---|
| | 1A | 2A | 3A | 4A | 5A | 6A | 7A |
| $SiO_2$ | 65.2 | 64.6 | 64.0 | 64.5 | 63.9 | 63.3 | 64.8 |
| $Al_2O_3$ | 7.6 | 7.8 | 8.1 | 7.5 | 7.5 | 8.0 | 7.8 |
| $B_2O_3$ | | | | | | | |
| $Li_2O$ | 0.1 | 0.3 | 0.6 | 0.8 | 0.1 | 0.7 | 0.1 |
| $Na_2O$ | 18.4 | 15.7 | 12.9 | 18.2 | 18.1 | 12.8 | 19.7 |
| $K_2O$ | 2.0 | 1.8 | 1.5 | 1.3 | 2.0 | 1.4 | 1.0 |
| MgO | 6.6 | 9.8 | 12.9 | 6.5 | 6.4 | 12.8 | 6.5 |
| CaO | | | | | | | |
| $ZrO_2$ | | | | 1.0 | 2.0 | 1.0 | |
| $SnO_2$ | 0.1 | | 0.1 | 0.1 | | | 0.1 |
| $SO_3$ | | 0.1 | | | 0.1 | 0.1 | |
| $Na_2O + Li_2O + K_2O$ | 20.5 | 17.8 | 15.0 | 20.3 | 20.2 | 14.9 | 20.8 |
| $Li_2O/(Na_2O + Li_2O + K_2O)$ | 0.005 | 0.017 | 0.040 | 0.039 | 0.005 | 0.047 | 0.005 |
| $SiO_2—(½Al_2O_3)$ | 61.4 | 60.6 | 59.9 | 60.7 | 60.1 | 59.3 | 61.0 |
| Tg (° C.) | 535 | 578 | 613 | 543 | 577 | 619 | 541 |
| Compressive layer measurability | Good | Good | Good | Good | Good | Good | Good |
| Shape-processability by etching | Good | Good | Good | Good | Good | Good | Good |

TABLE 1-2

| | Examples | | | | | | |
|---|---|---|---|---|---|---|---|
| | 8A | 9A | 10A | 11A | 12A | 13A | 14A |
| $SiO_2$ | 64.9 | 64.5 | 64.2 | 64.8 | 64.7 | 64.6 | 64.6 |
| $Al_2O_3$ | 7.7 | 7.9 | 8.0 | 7.7 | 7.8 | 7.8 | 8.8 |
| $B_2O_3$ | | | | | | | |
| $Li_2O$ | 0.3 | 0.1 | 0.3 | 0.5 | 0.7 | 0.1 | 0.3 |
| $Na_2O$ | 17.0 | 18.4 | 17.0 | 15.8 | 16.3 | 15.6 | 15.7 |
| $K_2O$ | 1.8 | 1.0 | 0.8 | 2.1 | 1.4 | 2.0 | 1.8 |
| MgO | 8.2 | 8.1 | 9.7 | 9.1 | 9.1 | 9.8 | 8.8 |
| CaO | | | | | | | |
| $ZrO_2$ | | | | | | | |
| $SnO_2$ | 0.1 | | | | | 0.1 | |
| $SO_3$ | | 0.1 | 0.1 | 0.1 | 0.1 | | 0.1 |
| $Na_2O + Li_2O + K_2O$ | 19.1 | 19.5 | 18.1 | 18.4 | 18.4 | 17.7 | 17.8 |
| $Li_2O/(Na_2O + Li_2O + K_2O)$ | 0.016 | 0.005 | 0.017 | 0.027 | 0.038 | 0.006 | 0.017 |
| $SiO_2—(½Al_2O_3)$ | 61.0 | 60.6 | 60.2 | 60.9 | 60.8 | 60.6 | 60.1 |
| Tg (° C.) | 553 | 564 | 579 | 562 | 566 | 583 | 579 |
| Compressive layer measurability | Good | Good | Good | Good | Good | Good | Good |
| Shape-processability by etching | Good | Good | Good | Good | Good | Good | Good |

TABLE 1-3

| | Examples | | | | | | |
|---|---|---|---|---|---|---|---|
| | 15A | 16A | 17A | 18A | 19A | 20A | 21A |
| $SiO_2$ | 64.8 | 65.8 | 65.3 | 65.3 | 65.3 | 64.8 | 64.8 |
| $Al_2O_3$ | 8.7 | 7.7 | 8.7 | 8.7 | 8.7 | 8.7 | 8.7 |
| $B_2O_3$ | | | | | | | |
| $Li_2O$ | 0.5 | 0.7 | 0.1 | 0.3 | 0.5 | 0.7 | 0.003 |
| $Na_2O$ | 15.8 | 15.8 | 15.2 | 15.8 | 15.8 | 15.8 | 15.8 |
| $K_2O$ | 2.1 | 1.9 | 2.5 | 1.8 | 2.1 | 1.9 | 2.6 |
| MgO | 8.1 | 8.1 | 8.1 | 8.1 | 7.6 | 8.1 | 8.1 |
| CaO | | | | | | | |
| $ZrO_2$ | | | | | | | |
| $SnO_2$ | | | 0.1 | | | | 0.1 |
| $SO_3$ | 0.1 | 0.1 | 0.0 | 0.1 | 0.1 | 0.1 | |
| $Na_2O + Li_2O + K_2O$ | 18.4 | 18.4 | 17.8 | 17.9 | 18.4 | 18.4 | 18.4 |
| $Li_2O/(Na_2O + Li_2O + K_2O)$ | 0.027 | 0.038 | 0.006 | 0.017 | 0.027 | 0.038 | 0.0001 |
| $SiO_2—(½Al_2O_3)$ | 60.4 | 61.9 | 60.9 | 60.9 | 60.9 | 60.4 | 60.4 |
| Tg (° C.) | 564 | 556 | 584 | 578 | 573 | 568 | 583 |
| Compressive layer measurability | Good | Good | Good | Good | Good | Good | Good |
| Shape-processability by etching | Good | Good | Good | Good | Good | Good | Good |

TABLE 1-4

| | Examples | | | | | | |
|---|---|---|---|---|---|---|---|
| | 22A | 23A | 24A | 25A | 26A | 27A | 28A |
| $SiO_2$ | 64.8 | 64.8 | 64.7 | 64.3 | 64.8 | 65.8 | 65.5 |
| $Al_2O_3$ | 8.7 | 8.7 | 8.7 | 8.6 | 8.7 | 7.7 | 8.0 |
| $B_2O_3$ | | | | | | | |
| $Li_2O$ | 0.02 | 0.08 | 0.21 | 0.84 | 0.80 | 0.40 | 0.1 |
| $Na_2O$ | 15.8 | 15.8 | 15.7 | 15.6 | 15.8 | 15.8 | 15.9 |
| $K_2O$ | 2.6 | 2.6 | 2.5 | 2.5 | 1.8 | 2.2 | 1.9 |
| MgO | 8.1 | 8.1 | 8.1 | 8.1 | 8.1 | 8.1 | 8.5 |
| CaO | | | | | | | |
| $ZrO_2$ | | | | | | | |
| $SnO_2$ | 0.1 | 0.1 | 0.1 | 0.1 | 0.1 | 0.1 | 0.1 |
| $SO_3$ | | | | | | | |
| $Na_2O + Li_2O + K_2O$ | 18.4 | 18.4 | 18.5 | 19.0 | 18.4 | 18.4 | 17.9 |
| $Li_2O/(Na_2O + Li_2O + K_2O)$ | 0.001 | 0.005 | 0.011 | 0.044 | 0.044 | 0.022 | 0.006 |
| $SiO_2—(½Al_2O_3)$ | 60.4 | 60.4 | 60.3 | 59.9 | 60.4 | 61.9 | 61.5 |
| Tg (° C.) | 578 | 576 | 568 | 551 | 560 | 558 | 574 |

TABLE 1-4-continued

|  | Examples | | | | | | |
|---|---|---|---|---|---|---|---|
|  | 22A | 23A | 24A | 25A | 26A | 27A | 28A |
| Compressive layer measurability | Good | Good | Good | Good | Good | Good | Good |
| Shape-processability by etching | Good | Good | Good | Good | Good | Good | Good |

TABLE 1-5

|  | Examples | | | | | | |
|---|---|---|---|---|---|---|---|
|  | 29A | 30A | 31A | 32A | 33A | 34A | 35A |
| $SiO_2$ | 65.0 | 65.5 | 65.5 | 65.5 | 64.5 | 68.3 | 68.7 |
| $Al_2O_3$ | 8.5 | 8.0 | 8.0 | 8.0 | 8.0 | 6.1 | 8.0 |
| $B_2O_3$ |  |  |  |  |  |  |  |
| $Li_2O$ | 0.3 | 0.1 | 0.4 | 0.8 | 0.4 | 0.1 | 0.3 |
| $Na_2O$ | 15.9 | 16.0 | 16.0 | 16.0 | 16.0 | 13.6 | 14.2 |
| $K_2O$ | 1.7 | 1.9 | 1.6 | 1.2 | 1.6 | 2.2 | 1.1 |
| MgO | 8.5 | 8.5 | 8.5 | 8.5 | 8.5 | 3.5 | 3.5 |
| CaO |  |  |  |  |  | 3.7 | 3.6 |
| $ZrO_2$ |  |  |  |  | 1.0 | 2.5 | 0.6 |
| $SnO_2$ | 0.1 |  | 0.1 |  | 0.1 |  |  |
| $SO_3$ |  | 0.1 |  | 0.1 |  | 0.1 | 0.1 |
| $Na_2O + Li_2O + K_2O$ | 17.9 | 18.0 | 18.0 | 18.0 | 18.0 | 15.9 | 15.6 |
| $Li_2O/(Na_2O + Li_2O + K_2O)$ | 0.017 | 0.006 | 0.022 | 0.044 | 0.022 | 0.006 | 0.019 |
| $SiO_2—(½Al_2O_3)$ | 60.8 | 61.5 | 61.5 | 61.5 | 60.5 | 65.2 | 64.7 |
| Tg (° C.) | 577 | 573 | 568 | 560 | 582 | 594 | 585 |
| Compressive layer measurability | Good | Good | Good | Good | Good | Good | Good |
| Shape-processability by etching | Good | Good | Good | Good | Good | Fair | Fair |

TABLE 1-6

|  | Examples | | | | | | |
|---|---|---|---|---|---|---|---|
|  | 36A | 37A | 38A | 39A | 40A | 41A | 42A |
| $SiO_2$ | 65.4 | 67.3 | 64.5 | 65.0 | 65.2 | 63.7 | 64.8 |
| $Al_2O_3$ | 9.4 | 7.8 | 8.0 | 8.0 | 7.5 | 9.0 | 8.2 |
| $B_2O_3$ |  |  |  |  | 1.0 |  |  |
| $Li_2O$ | 0.5 | 0.7 | 0.05 | 2.0 | 0.3 | 0.1 | 0.1 |
| $Na_2O$ | 15.1 | 15.0 | 21.0 | 15.0 | 13.2 | 15.9 | 13.3 |
| $K_2O$ | 1.8 | 1.5 |  |  | 4.0 | 3.1 | 5.3 |
| MgO | 3.5 | 3.5 | 6.5 | 8.0 | 8.8 | 8.2 | 8.3 |
| CaO | 3.7 | 3.6 |  |  |  |  |  |
| $ZrO_2$ | 0.6 | 0.6 |  | 2.0 |  |  |  |
| $SnO_2$ |  |  |  | 0.1 | 0.1 | 0.1 | 0.1 |
| $SO_3$ | 0.1 | 0.1 | 0.1 |  |  |  |  |
| $Na_2O + Li_2O + K_2O$ | 17.4 | 17.2 | 21.0 | 17.0 | 17.5 | 19.1 | 18.7 |
| $Li_2O/(Na_2O + Li_2O + K_2O)$ | 0.029 | 0.041 | 0.002 | 0.118 | 0.017 | 0.005 | 0.005 |
| $SiO_2—(½Al_2O_3)$ | 60.7 | 63.4 | 60.5 | 61.0 | 61.5 | 59.2 | 60.7 |
| Tg (° C.) | 581 | 560 | 549 | 586 | 565 | 574 | 568 |
| Compressive layer measurability | Good | Good | Good | Fair | Good | Good | Good |
| Shape-processability by etching | Fair | Fair | Good | Good | Good | Good | Good |

TABLE 1-7

| Comparative Examples | 1A | 2A |
|---|---|---|
| $SiO_2$ | 66.1 | 65.0 |
| $Al_2O_3$ | 8.3 | 8.0 |
| $B_2O_3$ |  |  |
| $Li_2O$ | 12.0 | 4.0 |
| $Na_2O$ | 10.6 | 15.0 |
| $K_2O$ |  |  |
| MgO |  | 8.0 |
| CaO |  |  |

TABLE 1-7-continued

| Comparative Examples | 1A | 2A |
|---|---|---|
| $ZrO_2$ | 2.9 | |
| $SnO_2$ | 0.1 | 0.1 |
| $SO_3$ | | |
| $Na_2O + Li_2O + K_2O$ | 22.6 | 19.0 |
| $Li_2O/(Na_2O + Li_2O + K_2O)$ | 0.531 | 0.211 |
| $SiO_2 - \frac{1}{2}Al_2O_3$ | 62.0 | 61.0 |

TABLE 1-7-continued

| Comparative Examples | 1A | 2A |
|---|---|---|
| Tg (° C.) | 496 | 518 |
| Compressive layer measurability | Poor | Poor |
| Shape-processability by etching | Good | Good |

TABLE 2-1

| | Examples (Unit: mass %) | | | | | | | |
|---|---|---|---|---|---|---|---|---|
| | 1B | 2B | 3B | 4B | 5B | 6B | 7B | 8B |
| $SiO_2$ | 61.5 | 61.5 | 61.5 | 61.5 | 61.3 | 60.7 | 62.2 | 64.1 |
| $Al_2O_3$ | 14.0 | 14.0 | 14.0 | 14.0 | 14.0 | 13.1 | 13.0 | 13.4 |
| $B_2O_3$ | | | | | | | | |
| $Li_2O$ | 0.001 | 0.009 | 0.04 | 0.10 | 0.40 | 0.96 | 0.95 | 1.96 |
| $Na_2O$ | 15.3 | 15.3 | 15.3 | 15.3 | 15.3 | 14.8 | 14.7 | 15.2 |
| $K_2O$ | 3.8 | 3.8 | 3.8 | 3.8 | 3.8 | | | |
| MgO | 5.2 | 5.2 | 5.2 | 5.2 | 5.2 | 6.5 | 5.1 | 5.3 |
| $ZrO_2$ | | | | | | 3.9 | 3.9 | |
| $SnO_2$ | 0.1 | 0.1 | 0.1 | 0.1 | 0.1 | 0.1 | 0.1 | 0.1 |
| $SO_3$ | | | | | | | | |
| $SiO_2 - \frac{1}{2}Al_2O_3$ | 54.5 | 54.5 | 54.5 | 54.4 | 54.3 | 54.1 | 55.7 | 57.4 |
| $R_2O$ | 19.2 | 19.2 | 19.2 | 19.2 | 19.5 | 15.8 | 15.7 | 17.1 |
| $R_2O - Al_2O_3$ | 5.1 | 5.1 | 5.1 | 5.2 | 5.5 | 2.7 | 2.7 | 3.7 |
| $Na_2O/R_2O$ | 0.801 | 0.801 | 0.800 | 0.797 | 0.785 | 0.939 | 0.939 | 0.885 |
| $MgO/R_2O$ | 0.271 | 0.271 | 0.270 | 0.269 | 0.265 | 0.410 | 0.328 | 0.309 |
| $Li_2O/R_2O$ | 0.000 | 0.001 | 0.003 | 0.006 | 0.026 | 0.065 | 0.065 | 0.129 |
| liquidus temperature (° C.) | 921 | <850 | 879 | 914 | <850 | 1143 | 1071 | 927 |
| Glass transition point (° C.) | 583 | 578 | 576 | 568 | 551 | 589 | 586 | 518 |
| Strain point (° C.) | 538 | 533 | 531 | 523 | 506 | 544 | 541 | 473 |
| $\alpha (\times 10^{-7})$ | 102 | 102 | 100 | 100 | 94 | 88 | 87 | 96 |
| Density (g/cm³) | 2.46 | 2.45 | 2.45 | 2.46 | 2.46 | 2.53 | 2.51 | 2.46 |
| Refractive index | 1.5065 | 1.5063 | 1.5069 | 1.5064 | 1.5081 | 1.5239 | 1.521 | 1.5127 |
| Surface stress (MPa) | 719 | 660 | 655 | 610 | 559 | 935 | 838 | 356 |
| surface stress depth of layer (μm) | 51 | 54 | 54 | 53 | 52 | 22 | 23 | 25 |

TABLE 2-2

| | Examples (Unit: mass %) | | | | | | | |
|---|---|---|---|---|---|---|---|---|
| | 9B | 10B | 11B | 12B | 13B | 14B | 15B | 16B |
| $SiO_2$ | 62.0 | 63.1 | 62.8 | 63.0 | 63.2 | 61.4 | 46.5 | 52.4 |
| $Al_2O_3$ | 14.2 | 12.6 | 13.0 | 13.1 | 13.1 | 12.9 | 24.8 | 18.7 |
| $B_2O_3$ | | | | | | | | 1.1 |
| $Li_2O$ | 0.38 | 0.19 | 0.05 | 0.19 | 0.38 | 0.19 | 0.05 | 0.27 |
| $Na_2O$ | 15.5 | 15.5 | 15.7 | 15.8 | 15.8 | 15.6 | 18.7 | 15.1 |
| $K_2O$ | 2.6 | 3.2 | 2.9 | 2.4 | 1.8 | 2.4 | 3.4 | 7.1 |
| MgO | 5.2 | 5.2 | 5.5 | 5.5 | 5.5 | 5.4 | 6.4 | 5.2 |
| $ZrO_2$ | | | | | | 2.0 | | |
| $SnO_2$ | | | | | | | 0.1 | 0.1 |
| $SO_3$ | 0.1 | 0.1 | 0.1 | 0.1 | 0.1 | 0.1 | | |
| $SiO_2 - \frac{1}{2}Al_2O_3$ | 54.9 | 56.9 | 56.3 | 56.5 | 56.7 | 54.9 | 34.1 | 43.1 |
| $R_2O$ | 18.5 | 18.9 | 18.6 | 18.4 | 18.0 | 18.2 | 22.2 | 22.4 |
| $R_2O - Al_2O_3$ | 4.3 | 6.4 | 5.6 | 5.3 | 4.9 | 5.3 | -2.6 | 3.7 |
| $Na_2O/R_2O$ | 0.837 | 0.819 | 0.844 | 0.858 | 0.878 | 0.858 | 0.843 | 0.673 |
| $MgO/R_2O$ | 0.283 | 0.277 | 0.294 | 0.298 | 0.305 | 0.298 | 0.290 | 0.234 |
| $Li_2O/R_2O$ | 0.025 | 0.012 | 0.003 | 0.012 | 0.024 | 0.012 | 0.002 | 0.018 |
| liquidus temperature (° C.) | 943 | <700 | <693 | <716 | 860 | <695 | 1100 | 1092 |
| Glass transition point (° C.) | 560 | 558 | 573 | 568 | 560 | 582 | 622 | 556 |
| Strain point (° C.) | 515 | 513 | 528 | 523 | 515 | 537 | 577 | 511 |
| $\alpha (\times 10^{-7})$ | 101 | 101 | 101 | 97 | 98 | 97 | 109 | 112 |
| Density (g/cm³) | 2.45 | 2.45 | 2.46 | 2.46 | 2.46 | 2.49 | 2.53 | 2.49 |
| Refractive index | 1.5077 | 1.5067 | 1.5063 | 1.5064 | 1.508 | 1.5135 | 1.51898 | 1.5126 |
| Surface stress (MPa) | 600 | 558 | 654 | 646 | 610 | 792 | 1047 | 739 |

TABLE 2-2-continued

| | Examples (Unit: mass %) | | | | | | | |
|---|---|---|---|---|---|---|---|---|
| | 9B | 10B | 11B | 12B | 13B | 14B | 15B | 16B |
| surface stress depth of layer (μm) | 43.3 | 47 | 42.9 | 42 | 36.8 | 37.5 | 48 | 52 |

TABLE 2-3

| | Examples (Unit: mass %) | | | | | | | |
|---|---|---|---|---|---|---|---|---|
| | 17B | 18B | 19B | 20B | 21B | 22B | 23B | 24B |
| $SiO_2$ | 52.7 | 63.1 | 63.2 | 64.0 | 59.8 | 59.9 | 62 | 62.2 |
| $Al_2O_3$ | 22.0 | 13.2 | 13.2 | 13.4 | 10.7 | 10.5 | 13 | 12.6 |
| $B_2O_3$ | | | | | | | | |
| $Li_2O$ | 0.05 | 2.48 | 2.28 | 2.10 | 0.005 | 0.005 | 0.005 | 0.005 |
| $Na_2O$ | 16.6 | 14.9 | 15.0 | 15.1 | 17.4 | 12.4 | 20.7 | 10.3 |
| $K_2O$ | 2.8 | | | | 6.2 | 9.2 | | 6.4 |
| MgO | 5.9 | 5.2 | 5.2 | 5.3 | 2.0 | 4.0 | 4.2 | 8.4 |
| $ZrO_2$ | | 1.0 | 1.0 | | 3.8 | 3.8 | | |
| $SnO_2$ | 0.1 | 0.1 | 0.1 | 0.1 | | | | 0.1 |
| $SO_3$ | | | | | 0.1 | 0.1 | 0.1 | |
| $SiO_2 - \frac{1}{2}Al_2O_3$ | 41.7 | 56.5 | 56.6 | 57.3 | 54.5 | 54.7 | 55.5 | 55.9 |
| $R_2O$ | 19.4 | 17.4 | 17.2 | 17.2 | 23.6 | 21.6 | 20.7 | 16.7 |
| $R_2O - Al_2O_3$ | -2.6 | 4.2 | 4.0 | 3.9 | 12.9 | 11.2 | 7.7 | 4.1 |
| $Na_2O/R_2O$ | 0.856 | 0.86 | 0.87 | 0.88 | 0.74 | 0.57 | 1.00 | 0.62 |
| $MgO/R_2O$ | 0.304 | 0.30 | 0.30 | 0.31 | 0.09 | 0.19 | 0.20 | 0.50 |
| $Li_2O/R_2O$ | 0.003 | 0.16 | 0.15 | 0.14 | 0.0003 | 0.0004 | 0.0002 | 0.0005 |
| liquidus temperature (° C.) | 1100 | 950 | 941 | 933 | <700 | <700 | <700 | >1200 |
| Glass transition point (° C.) | 627 | 510 | 515 | 514 | 527 | 572 | 551 | 623 |
| Strain point (° C.) | 582 | 465 | 470 | 469 | 482 | 527 | 506 | 578 |
| $\alpha$ (×$10^{-7}$) | 100 | 95 | 96 | 96 | 113 | 106 | 103 | 92 |
| Density (g/cm$^3$) | 2.50 | 2.47 | 2.47 | 2.46 | 2.51 | 2.50 | 2.46 | 2.45 |
| Refractive index | 1.5141 | 1.5182 | 1.5175 | 1.5132 | 1.516 | 1.516 | 1.5063 | 1.506 |
| Surface stress (MPa) | 1057 | 343 | 375 | 333 | 236 | 587 | 354 | 656 |
| surface stress depth of layer (μm) | 40 | 20 | 22 | 21 | 83 | 67 | 53.4 | 39 |

TABLE 2-4

| | Comparative Examples (Unit: mass %) | | | |
|---|---|---|---|---|
| | 1B | 2B | 3B | 4B |
| $SiO_2$ | 53.2 | 54.4 | 55.4 | 72.1 |
| $Al_2O_3$ | 19.0 | 19.0 | 19.0 | 1.8 |
| $Na_2O$ | 9.0 | 9.0 | 8.0 | 13.0 |
| $K_2O$ | 6.2 | 5.0 | 5.0 | 0.5 |
| MgO | 3.0 | — | — | 4.0 |
| CaO | 6.5 | 6.5 | 6.5 | 8.6 |
| SrO | — | 3.0 | 3.0 | — |
| $ZrO_2$ | 3.0 | 3.0 | 3.0 | — |
| $SnO_2$ | 0.1 | 0.1 | 0.1 | — |
| Strain point (° C.) | 625 | 632 | 647 | 510 |
| $\alpha$ (×$10^{-7}$) | 88 | 86 | 83 | 87 |
| Density (g/cm$^3$) | 2.56 | 2.56 | 2.58 | 2.50 |
| Surface stress (MPa) | 1046 | 1065 | 930 | 588 |
| surface stress depth of layer (μm) | 19 | 16 | 16 | 17 |

Liquidus Temperature (Tl):

The glass substrate was pulverized, and glass particles that passed through a 2380-μm sieve but remained on a 1000-μm sieve were immersed into ethanol, subjected to ultrasonic cleaning, and then dried in a constant-temperature oven. Then, 25 g of the glass particles were placed on a 12 mm wide, 200 mm long, 10 mm thick platinum board so that they assume a substantially constant thickness, and were placed in an electric furnace having a temperature gradient from 700° C. to 1200° C. and kept therein for 24 hours. Then, the particles were taken out from the furnace, and devitrification that occurred inside the glass was observed with an optical microscope at a magnification of 40 times. The maximum temperature at which devitrification was observed was found as the liquidus temperature.

Glass Transition Temperature:

The glass was processed into a circular cylinder 5 mm in diameter and 20 mm long, and the glass transition temperature (Tg) was measured with a differential dilatometer (Thermo Plus2 TMA8310).

Strain Point:

The glass was cut out into a 3-by-3-by-55-mm right square prism and was ground, and the strain point thereof was measured with a beam bending viscometer (product of Tokyo Kogyo Co., Ltd.). The strain point was found by calculation according to the beam bending method (ASTM C-598).

Coefficient of Linear Thermal Expansion:

The glass was processed into a circular cylinder 5 mm in diameter and 20 mm long, and was subjected to measurement using a differential dilatometer (Thermo Plus2 TMA8310). The average thermal expansion coefficient in the temperature range of 100° C. to 300° C. (a) was calculated from the measurement results.

Density:

The density was measured according to the Archimedean method known in the art.

Shape-Processability by Etching:

The glass substrate was cut into a size 20 to 50 mm long, 20 to 40 mm wide, and 0.7 mm thick and was ground and polished. After being rinsed, the glass substrate was immersed for 20 minutes in 400 mL of aqueous HF solution (concentration: 10% by mass; temperature: 22° C.) held in a container. Then, the end surfaces of the etched glass substrate were observed. The glass substrate was then rinsed with water, and the thickness and mass thereof were measured and compared with those measured prior to the test, to calculate the etching rate of the glass substrate. A glass substrate having an etching rate of 3.0 μm/minute or higher and in which no precipitates were observed on the end surfaces of the glass substrate was evaluated "Good", as being suitable for shape-processing by etching; a glass substrate having an etching rate of 3.0 μm/minute or higher but in which precipitates were observed on the end surfaces of the glass substrate was evaluated as "Fair"; and a glass substrate having an etching rate below 3.0 μm/minute was evaluated as "Poor".

Measurement of Compressive-Stress Value and Surface Stress Depth of Layer:

The cover glass (strengthened glass) obtained as above was observed as is to find the number of interference fringes and the interval therebetween with a surface stress meter (FSM-6000LE from Orihara Industrial Co., Ltd.), and the compressive-stress value of the compressive-stress layer formed in the vicinity of the surface of the glass and the surface stress depth of layer were calculated.

The value of the refractive index (nd) of each cover glass was measured with a refractometer (KPR-200 from Shimadzu Device Corporation) and was used for the calculation. Note that the stress optical coefficient of each cover glass was regarded as 28 ((nm/cm)/MPa) in the calculation.

A cover glass in which a fringe pattern caused by the refractive index was observed and for which the measurement of the compressive-stress value and the surface stress depth of layer with the surface stress meter was possible was evaluated as "Good"; a cover glass in which only a faint fringe pattern caused by the refractive index was observed but for which the measurement of the compressive-stress value and the surface stress depth of layer with the surface stress meter was possible was evaluated as "Fair"; and a cover glass in which no fringe pattern caused by the refractive index was observed and for which the measurement of the compressive-stress value and the surface stress depth of layer was not possible was evaluated as "Poor".

The measurement results of the compressive layer depth of the compressive-stress layer and the compressive-stress value of each cover glass shown in Examples 26A, 27A, 31A, and 33A are shown in the Table below.

TABLE 3

| Examples | Compressive layer depth (μm) | Compressive-stress value (MPa) |
|---|---|---|
| 26A | 37 | 526 |
| 27A | 41 | 516 |
| 31A | 38 | 555 |
| 33A | 35 | 604 |

The measurement results of the compressive layer depth of the compressive-stress layer and the compressive-stress value of each cover glass shown in Examples 26A, 27A, 31A, and 33A obtained by chemically strengthening each glass substrate by immersing same for about 5 hours in a treatment bath containing 95% of $KNO_3$ and 5% of $NaNO_3$ kept at 450° C., are shown in the Table below.

TABLE 4

| Examples | Compressive layer depth (μm) | Compressive-stress value (MPa) |
|---|---|---|
| 26A | 51.2 | 515 |
| 27A | 60 | 446 |
| 31A | 53.7 | 494 |
| 33A | 49.4 | 554 |

Production of Cover Glass by Continuous Melting:

Glass raw materials were prepared so as to provide glass substrates with the compositions shown in Examples 31A and 12B. The glass raw materials were molten at 1520° C. by using a continuous melting device having, for example, a fire-brick-made melting tank and a platinum-made stirring tank, were subjected to refining at 1550° C., stirred at 1350° C., and then formed into thin plate-shaped glass substrates 0.7 mm thick by down-draw processing.

Then, on each of the two principal surfaces of each glass substrate prepared as above, a 20-μm-thick pattern made of a phenolic heat-curable resin and having the shape of a cover glass was formed by mesh-screen printing, and the phenolic heat-curable resin patterns were baked for 15 minutes at 200° C. With the phenolic heat-curable resin patterns being employed as masks, the glass substrate was etched in the regions-to-be-etched from both principal surfaces by using a mixed-acid aqueous solution (40° C.) containing hydrofluoric acid (15% by mass) and sulfuric acid (24% by mass) as the etchant, to cut the glass substrate into a predetermined shape.

Then, the phenolic heat-curable resin remaining on the glass was molten by using an NaOH solution and was stripped off from the glass, and then the glass was rinsed.

Then, the rinsed glass substrate was immersed for about 5 hours in a treatment bath containing 95% of $KNO_3$ and 5% of $NaNO_3$ (for Example 31A) or for about 2 hours in a treatment bath containing 100% of $KNO_3$ (for Example 12B), each bath kept at 450° C., to thereby chemically strengthen the glass substrate. The chemically-strengthened glass was immersed in a rinsing tank for rinsing and then dried.

The result was that it was possible to produce a glass substrate and a strengthened glass having excellent quality and with which the depth of the compressive-stress layer and the compressive-stress value can be measured while retaining the shape of the glass. It was also possible to shorten the ion-exchange processing time.

Anticipated applications of the cover glass of the present embodiment include, but are not limited to, cover glass for equipment such as mobile phones, digital cameras, and personal digital assistants (PDAs), cover glass for various displays, such as touchscreens and flat panel displays, various glass substrates, substrates for magnetic disks, cover glass for solar cells, and cover glass for solid-state image sensors.

What is claimed is:

1. A cover glass comprising a compressive-stress layer on principal surfaces thereof, the cover glass having a glass composition containing
   50% to 70% by mole of $SiO_2$,
   3% to 20% by mole of $Al_2O_3$,
   5% to 25% by mole of $Na_2O$,
   more than 0% by mole and less than or equal to 2.5% by mole of $Li_2O$,
   0% to 5.5% by mole of $K_2O$,
   0% to less than 3% by mole of $B_2O_3$, and
   more than or equal to 0.11% by mole of $MgO/(Li_2O+Na_2O+K_2O)$,
   wherein the glass composition does not substantially contain $As_2O_3$ and $Sb_2O_3$.

2. The cover glass according to claim 1, further containing 3% to 15% by mole of MgO.

3. The cover glass according to claim 1, containing 15.5% to 30% by mole of $Na_2O+Li_2O+K_2O$.

4. The cover glass according to claim 1, containing more than 12% by mole of $Na_2O$.

5. The cover glass according to claim 1, wherein $Li_2O/(Na_2O+Li_2O+K_2O)$ is greater than 0 and less than or equal to 0.2 in mole fraction.

6. The cover glass according to claim 1, in which the glass composition does not contain SrO, BaO and ZnO.

7. The cover glass according to claim 1, in which the glass composition contains more than 0% by mole and less than or equal to 0.2% by mole of $Li_2O/(Na_2O+Li_2O+K_2O)$.

8. The cover glass according to claim 1, in which the glass composition does not substantially contain CaO.

9. The cover glass according to claim 1, wherein the amount of MgO is larger than the amount of CaO in the glass composition.

10. A strengthened glass comprising a compressive-stress layer on principal surfaces thereof, the strengthened glass having a glass composition containing
50% to 70% by mole of $SiO_2$,
3% to 20% by mole of $Al_2O_3$,
5% to 25% by mole of $Na_2O$,
more than 0% by mole and less than or equal to 2.5% by mole of $Li_2O$,
0% to 5.5% by mole of $K_2O$,
0% to less than 3% by mole of $B_2O_3$, and
more than or equal to 0.11% by mole of $MgO/(Li_2O+Na_2O+K_2O)$,
wherein the glass composition does not substantially contain $As_2O_3$ and $Sb_2O_3$.

11. The strengthened glass according to claim 10, in which the glass composition does not substantially contain CaO.

12. The cover glass according to claim 10, wherein the amount of MgO is larger than the amount of CaO in the glass composition.

13. A cover glass comprising a compressive-stress layer on principal surfaces thereof, the cover glass having a glass composition containing
45% to 70% by mass of $SiO_2$,
5% to 25% by mass of $Al_2O_3$,
9% to 25% by mass of $Na_2O$,
more than 0% by mass and less than or equal to 2.5% by mass of $Li_2O$,
0% to 3% by mass of $B_2O_3$,
more than 0% by mass and less than or equal to 10% by mass of MgO, and
more than or equal to 0.11% by mole of $MgO/(Li_2O+Na_2O+K_2O)$,
wherein the compressive-stress layer has a surface stress depth of 30 µm or greater, and wherein the glass composition does not substantially contain $As_2O_3$ and $Sb_2O_3$.

14. The cover glass according to claim 13, further containing 0% to 15% by mass of $K_2O$.

15. The cover glass according to claim 13, further containing 0% to 5% by mass of $ZrO_2$.

16. The cover glass according to claim 13, containing 0% to 15% by mass of $K_2O$,
wherein $Li_2O+Na_2O+K_2O$ is 30% by mass or less.

17. The cover glass according to claim 13, wherein $SiO_2-(\frac{1}{2}Al_2O_3)$ is 57.5% by mass or less.

18. The cover glass according to claim 13, wherein the compressive-stress layer has a compressive stress of 400 MPa or greater and a surface stress depth of layer of 20 µm or greater.

19. The cover glass according to claim 13, containing more than 0% by mass and less than or equal to 10% by mass of $K_2O$.

20. The cover glass according to claim 13, in which the glass composition does not substantially contain SrO, BaO and ZnO.

21. The cover glass according to claim 13, in which the glass composition contains 0.15% or less by mass of $Li_2O/(Na_2O+Li_2O+K_2O)$.

22. The cover glass according to claim 13, in which the glass composition does not substantially contain CaO.

23. The cover glass according to claim 13, wherein the amount of MgO is larger than the amount of CaO in the glass composition.

24. A method for producing the cover glass as claimed in claim 1, comprising:
(i) preparing molten glass by melting a glass raw material;
(ii) forming the prepared molten glass into a plate-like shape by a down-draw process and thereby obtaining a glass substrate having a glass composition containing
50% to 70% by mole of $SiO_2$,
3% to 20% by mole of $Al_2O_3$,
5% to 25% by mole of $Na_2O$,
more than 0% by mole and less than or equal to 2.5% by mole of $Li_2O$,
0% to 5.5% by mole of $K_2O$,
0% to less than 3% by mole of $B_2O_3$, and
more than or equal to 0.11% by mole of $MgO/(Li_2O+Na_2O+K_2O)$; and
(iii) forming a compressive-stress layer on the surface of the glass substrate,
wherein the glass composition does not substantially contain $As_2O_3$ and $Sb_2O_3$.

* * * * *